(12) United States Patent
Zhang et al.

(10) Patent No.: US 11,963,170 B2
(45) Date of Patent: Apr. 16, 2024

(54) RESOURCE MAPPING METHOD AND APPARATUS

(71) Applicant: Huawei Technologies Co., Ltd., Shenzhen (CN)

(72) Inventors: Huazi Zhang, Hangzhou (CN); Rong Li, Hangzhou (CN); Xianbin Wang, Hangzhou (CN); Shengchen Dai, Hangzhou (CN); Yiqun Ge, Ottawa (CA); Yan Chen, Shanghai (CN); Jun Wang, Hangzhou (CN); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 520 days.

(21) Appl. No.: 17/187,364

(22) Filed: Feb. 26, 2021

(65) Prior Publication Data

US 2021/0185657 A1    Jun. 17, 2021

Related U.S. Application Data

(63) Continuation of application No. PCT/CN2019/103884, filed on Aug. 30, 2019.

(30) Foreign Application Priority Data

Aug. 31, 2018   (CN) .......................... 201811025065.6

(51) Int. Cl.
*H04W 72/20*      (2023.01)
(52) U.S. Cl.
CPC .................................. *H04W 72/20* (2023.01)
(58) Field of Classification Search
None
See application file for complete search history.

(56) References Cited

U.S. PATENT DOCUMENTS

2015/0098420 A1*   4/2015   Luo .................. H04L 1/0025
                                                 370/329
2016/0088599 A1    3/2016   Yang et al.
(Continued)

FOREIGN PATENT DOCUMENTS

CN        103200687 A        7/2013
CN        104702387 A        6/2015
(Continued)

OTHER PUBLICATIONS

Huawei, HiSilicon, "Discussion on the design of SCMA," 3GPP TSG RAN WG1 Meeting #94, Gothenburg, Sweden, R1-1809753, total 13 pages, 3rd Generation Partnership Project, Valbonne, France (Aug. 20-24, 2018).

*Primary Examiner* — Nguyen H Ngo
(74) *Attorney, Agent, or Firm* — Leydig, Voit & Mayer, Ltd.

(57) ABSTRACT

A resource mapping method and apparatus are described that reduce resource mapping complexity. The method includes an access network device obtaining resource mapping information of at least one terminal, and sending the resource mapping information to the at least one terminal respectively. The resource mapping information indicates a resource element RE to which each of the at least one terminal performs mapping in each RMB in a first resource mapping block RMB set. An RE to which a first terminal performs mapping in each RMB in the first RMB set is determined based on a first interleaved sequence, and the first interleaved sequence is determined based on a base sequence. The first terminal is any one of the at least one terminal, and the first RMB set includes at least one RMB.

10 Claims, 10 Drawing Sheets

(56) References Cited

U.S. PATENT DOCUMENTS

| | | | |
|---|---|---|---|
| 2018/0070255 A1 | 3/2018 | Hong et al. | |
| 2021/0045129 A1* | 2/2021 | Li | H04L 67/75 |
| 2021/0153208 A1* | 5/2021 | Li | H04W 72/20 |

FOREIGN PATENT DOCUMENTS

| | | |
|---|---|---|
| CN | 105264988 A | 1/2016 |
| CN | 106788929 A | 5/2017 |
| WO | 2017198197 A1 | 11/2017 |

* cited by examiner

RESOURCE MAPPING METHOD AND APPARATUS

CROSS-REFERENCE TO RELATED APPLICATIONS

This application is a continuation of international patent application PCT/CN2019/103884, filed on Aug. 30, 2019, which claims priority to Chinese Patent Application No. 201811025065.6, filed on Aug. 31, 2018. The disclosures of the aforementioned applications are hereby incorporated by reference in their entireties.

TECHNICAL FIELD

This application relates to the field of communications technologies, and in particular, to a resource mapping method and apparatus.

BACKGROUND

Currently, a mobile communications technology has developed from a first generation (1G) mobile communications technology to a fourth generation (4G) mobile communications technology, and a fifth generation (5G) mobile communications technology is also being studied and standardized. Each generation of mobile communications technologies has a corresponding physical layer multiple access mode. Multiple access modes of 1G to 4G are mainly orthogonal multiple access; to be specific, different terminals occupy different time resources or frequency resources. In 5G, to further improve system capacity and spectral efficiency, a non-orthogonal multiple access (NOMA) technology is proposed, to allow different terminals to multiplex a same time-frequency resource, and distinguish the terminals based on transmit powers of the different terminals in the same time-frequency resource.

It can be learned that for the foregoing NOMA scenario, a time-frequency resource used by a terminal to receive and send data needs to be determined. In the conventional technology, a method for mapping a resource by using a random seed is provided. Different random seeds are configured for different terminals, the different random seeds are used to generate different random sequences, and the different terminals use time-frequency resources corresponding to the different random sequences to receive and send data.

However, in the foregoing method for mapping a resource by using a random seed, a network device needs to maintain the different random seeds for the different terminals, and a large quantity of operations need to be performed in a process of generating the random sequences by using the random seeds. Consequently, a resource mapping procedure is relatively complex.

SUMMARY

This application provides a resource mapping method and apparatus, to reduce resource mapping complexity.

To achieve the foregoing objective, the following technical solutions are used in this application.

According to a first aspect, this application provides a resource mapping method. The method is applied to an access network device or a chip of an access network device, and the method includes: The access network device obtains resource mapping information of at least one terminal, and sends the resource mapping information to the at least one terminal respectively. The resource mapping information is used to indicate a resource element (RE) to which each of the at least one terminal performs mapping in each resource mapping block (RMB) in a first resource mapping block RMB set, an RE to which a first terminal performs mapping in each RMB in the first RMB set is determined based on a first interleaved sequence, the first interleaved sequence is determined based on a base sequence, the first terminal is any one of the at least one terminal, and the first RMB set includes at least one RMB.

According to the resource mapping method provided in this application, a plurality of interleaved sequences are generated based on one base sequence, and REs occupied by terminals to transmit information are determined based on different interleaved sequences. Because all the interleaved sequences used to indicate locations of the REs are generated based on the same base sequence, the access network device does not need to maintain a large quantity of random seeds, and a random sequence is not required to be generated for each terminal, so that implementation complexity of RE mapping for information transmission is reduced.

In a possible design, that the access network device obtains resource mapping information of at least one terminal may be specifically implemented as follows: The access network device determines the resource mapping information of the at least one terminal based on a resource mapping matrix, where the resource mapping matrix is an M×N matrix, M is a positive integer, N is a positive integer, and the resource mapping matrix includes a plurality of interleaved sequences, where each of the plurality of interleaved sequences is obtained based on the base sequence by using a preset algorithm, and the plurality of interleaved sequences include the first interleaved sequence; and at least one interleaved sequence corresponding to one row of elements in the resource mapping matrix is allocated to a second terminal for use, where an interleaved sequence corresponding to an element in an $i^{th}$ column of the row is used to determine an RE to which the second terminal performs mapping in each RMB in an $i^{th}$ RMB set; or at least one interleaved sequence corresponding to one column of elements in the resource mapping matrix is allocated to a third terminal for use, where an interleaved sequence corresponding to an element in a $j^{th}$ row of the column is used to determine an RE to which the third terminal performs mapping in each RMB in a $j^{th}$ RMB set, and the second terminal and the third terminal each are any one of the at least one terminal.

In a possible design, the resource mapping information is further used to indicate an RE to which each of the at least one terminal performs mapping in each RMB in a second RMB set, an RE to which a fourth terminal performs mapping in each RMB in the second RMB set is determined based on a second interleaved sequence, the second interleaved sequence is an interleaved sequence in the resource mapping matrix, the first RMB set and the second RMB set have at least one different RE, the second interleaved sequence and the first interleaved sequence have at least one different element, and the fourth terminal is any one of the at least one terminal. This indicates that REs occupied by modulation symbols in different RMB sets can be dynamically changed. Referring to FIG. 11, in the first RMB set (including six RMBs), REs occupied by modulation symbols of a terminal 1 in each RMB are RE #1, RE #2, RE #4, and RE #6, in the second RMB set (including one RMB), REs occupied by the modulation symbols of the terminal 1 in each RMB are RE #2, RE #4, RE #5, and RE #6, and in the third RMB set (including two RMBs), REs occupied by the modulation symbols of the terminal 1 in each RMB are RE #1, RE #4, and RE #5. In this way, a terminal transmits information by using different REs in RMBs in different RMB sets, to enhance information transmission security, and improve anti-interference performance of a communications system.

According to a second aspect, this application provides a resource mapping method. The method is applied to a terminal or a chip of a terminal, and the method includes: The terminal transmits information on a resource element RE mapped in an RMB in a first resource mapping block RMB set, where the RE to which the terminal performs mapping in each RMB in the first RMB set is determined based on a first interleaved sequence, the first interleaved sequence is determined based on a base sequence, the terminal is any one of at least one terminal served by an access network device, and the first RMB set includes at least one RMB. In this way, a plurality of interleaved sequences may be generated based on one base sequence, and REs occupied by terminals to transmit information are determined based on different interleaved sequences. Because all the interleaved sequences used to indicate locations of the REs are generated based on the same base sequence, the access network device does not need to maintain a large quantity of random seeds, and a random sequence is not required to be generated for each terminal, so that implementation complexity of RE mapping for information transmission is reduced.

In a possible design, before the terminal transmits the information on the resource element RE mapped in the RMB in the first resource mapping block RMB set, the terminal may further perform the following step: The terminal receives resource mapping information sent by the access network device, where the resource mapping information is used to indicate the RE to which the terminal performs mapping in each RMB in the first RMB set.

In a possible design, the resource mapping information is obtained based on a resource mapping matrix, the resource mapping matrix is an M×N matrix, M is a positive integer, N is a positive integer, and the resource mapping matrix includes a plurality of interleaved sequences, where each of the plurality of interleaved sequences is obtained based on the base sequence by using a preset algorithm, and the plurality of interleaved sequences include the first interleaved sequence.

Optionally, this application provides two interleaved sequence allocation methods: One is that at least one interleaved sequence corresponding to one row of elements in the resource mapping matrix is allocated to the terminal for use, where an interleaved sequence corresponding to an element in an $i^{th}$ column of the row is used to determine an RE to which the terminal performs mapping in each RMB in an $i^{th}$ RMB set; and the other is that at least one interleaved sequence corresponding to one column of elements in the resource mapping matrix is allocated to the terminal for use, where an interleaved sequence corresponding to an element in a $j^{th}$ row of the column is used to determine an RE to which the terminal performs mapping in each RMB in a $j^{th}$ RMB set.

In a possible design, the terminal may further perform the following step: The terminal transmits the information on an RE mapped in an RMB in a second RMB set, where the RE to which the terminal performs mapping in each RMB in the second RMB set is determined based on a second interleaved sequence, the second interleaved sequence is an interleaved sequence in the resource mapping matrix, second RMB set and the first RMB set have at least one different RE, and the second interleaved sequence and the first interleaved sequence have at least one different element. In this way, REs occupied by modulation symbols in different RMB sets can be dynamically changed, to enhance information transmission security, and improve anti-interference performance of a communications system.

According to a third aspect, this application provides a resource mapping apparatus, where a processor and a transceiver are disposed on the resource mapping apparatus. The processor is configured to obtain resource mapping information of at least one terminal, where the resource mapping information is used to indicate a resource element RE to which each of the at least one terminal performs mapping in each RMB in a first resource mapping block RMB set, an RE to which a first terminal performs mapping in each RMB in the first RMB set is determined based on a first interleaved sequence, the first interleaved sequence is determined based on a base sequence, the first terminal is any one of the at least one terminal, and the first RMB set includes at least one RMB. The transceiver is configured to send the resource mapping information to the at least one terminal respectively.

In a possible design, the processor is configured to determine the resource mapping information of the at least one terminal based on a resource mapping matrix, where the resource mapping matrix is an M×N matrix, M is a positive integer, N is a positive integer, and the resource mapping matrix includes a plurality of interleaved sequences, where each of the plurality of interleaved sequences is obtained based on the base sequence by using a preset algorithm, and the plurality of interleaved sequences include the first interleaved sequence; and at least one interleaved sequence corresponding to one row of elements in the resource mapping matrix is allocated to a second terminal for use, where an interleaved sequence corresponding to an element in an $i^{th}$ column of the row is used to determine an RE to which the second terminal performs mapping in each RMB in an $i^{th}$ RMB set; or at least one interleaved sequence corresponding to one column of elements in the resource mapping matrix is allocated to a third terminal for use, where an interleaved sequence corresponding to an element in a $j^{th}$ row of the column is used to determine an RE to which the third terminal performs mapping in each RMB in a $j^{th}$ RMB set, and the second terminal and the third terminal each are any one of the at least one terminal.

In a possible design, the resource mapping information is further used to indicate an RE to which each of the at least one terminal performs mapping in each RMB in a second RMB set, an RE to which a fourth terminal performs mapping in each RMB in the second RMB set is determined based on a second interleaved sequence, the second interleaved sequence is an interleaved sequence in the resource mapping matrix, the first RMB set and the second RMB set have at least one different RE, the second interleaved sequence and the first interleaved sequence have at least one different element, and the fourth terminal is any one of the at least one terminal.

According to a fourth aspect, this application provides a resource mapping apparatus, where a processor and a transceiver are disposed on the resource mapping apparatus. The processor is configured to obtain a resource element RE mapped in an RMB in a first resource mapping block RMB set. The transceiver is configured to transmit information on the RE mapped in the RMB in the first RMB set, where the RE to which a terminal performs mapping in each RMB in the first RMB set is determined based on a first interleaved sequence, the first interleaved sequence is determined based on a base sequence, the terminal is any one of at least one terminal served by an access network device, and the first RMB set includes at least one RMB.

In a possible design, the transceiver is further configured to receive resource mapping information sent by the access network device, where the resource mapping information is used to indicate the RE to which the terminal performs mapping in each RMB in the first RMB set.

In a possible design, the resource mapping information is obtained based on a resource mapping matrix, the resource mapping matrix is an M×N matrix, M is a positive integer, N is a positive integer, and the resource mapping matrix includes a plurality of interleaved sequences, where each of the plurality of interleaved sequences is obtained based on the base sequence by using a preset algorithm, and the plurality of interleaved sequences include the first interleaved sequence.

Optionally, in this application, an interleaved sequence is allocated to the terminal in the following two manners:

Manner 1: At least one interleaved sequence corresponding to one row of elements in the resource mapping matrix is allocated to the terminal for use, where an interleaved sequence corresponding to an element in an $i^{th}$ column of the row is used to determine an RE to which the terminal performs mapping in each RMB in an $i^{th}$ RMB set.

Manner 2: At least one interleaved sequence corresponding to one column of elements in the resource mapping matrix is allocated to the terminal for use, where an interleaved sequence corresponding to an element in a $j^{th}$ row of the column is used to determine an RE to which the terminal performs mapping in each RMB in a $j^{th}$ RMB set.

In a possible design, the transceiver is further configured to transmit the information on an RE mapped in an RMB in a second RMB set, where the RE to which the terminal performs mapping in each RMB in the second RMB set is determined based on a second interleaved sequence, the second interleaved sequence is an interleaved sequence in the resource mapping matrix, the second RMB set and the first RMB set have at least one different RE, and the second interleaved sequence and the first interleaved sequence have at least one different element.

According to a fifth aspect, this application provides a resource mapping apparatus, where the resource mapping apparatus includes an obtaining module, a sending module, and a receiving module. The obtaining module is configured to obtain resource mapping information of at least one terminal, where the resource mapping information is used to indicate a resource element RE to which each of the at least one terminal performs mapping in each RMB in a first resource mapping block RMB set, an RE to which a first terminal performs mapping in each RMB in the first RMB set is determined based on a first interleaved sequence, the first interleaved sequence is determined based on a base sequence, the first terminal is any one of the at least one terminal, and the first RMB set includes at least one RMB. The sending module is configured to send, based on the information obtained by the obtaining module, the resource mapping information to the at least one terminal respectively. The receiving module is configured to receive, by using the RE to which the first terminal performs mapping in the RMB in the first RMB set, uplink information sent by the first terminal.

In a possible design, that the obtaining module is configured to obtain the resource mapping information of the at least one terminal includes: the obtaining module is configured to determine the resource mapping information of the at least one terminal based on a resource mapping matrix, where the resource mapping matrix is an M×N matrix, M is a positive integer, N is a positive integer, and the resource mapping matrix includes a plurality of interleaved sequences, where each of the plurality of interleaved sequences is obtained based on the base sequence by using a preset algorithm, and the plurality of interleaved sequences include the first interleaved sequence; and at least one interleaved sequence corresponding to one row of elements in the resource mapping matrix is allocated to a second terminal for use, where an interleaved sequence corresponding to an element in an $i^{th}$ column of the row is used to determine an RE to which the second terminal performs mapping in each RMB in an $i^{th}$ RMB set; or at least one interleaved sequence corresponding to one column of elements in the resource mapping matrix is allocated to a third terminal for use, where an interleaved sequence corresponding to an element in a $j^{th}$ row of the column is used to determine an RE to which the third terminal performs mapping in each RMB in a $j^{th}$ RMB set, and the second terminal and the third terminal each are any one of the at least one terminal.

In a possible design, the resource mapping information is further used to indicate an RE to which each of the at least one terminal performs mapping in each RMB in a second RMB set, an RE to which a fourth terminal performs mapping in each RMB in the second RMB set is determined based on a second interleaved sequence, the second interleaved sequence is an interleaved sequence in the resource mapping matrix, the first RMB set and the second RMB set have at least one different RE, the second interleaved sequence and the first interleaved sequence have at least one different element, and the fourth terminal is any one of the at least one terminal.

According to a sixth aspect, this application provides a resource mapping apparatus. The resource mapping apparatus includes an obtaining module, a transmission module, and a receiving module. The obtaining module is configured to obtain a resource element RE mapped in an RMB in a first resource mapping block RMB set. The transmission module is configured to transmit information on the RE mapped in the RMB in the first RMB set, where the RE to which a terminal performs mapping in each RMB in the first RMB set is determined based on a first interleaved sequence, the first interleaved sequence is determined based on a base sequence, the terminal is any one of at least one terminal served by an access network device, and the first RMB set includes at least one RMB.

In a possible design, the receiving module is configured to receive resource mapping information sent by the access network device, where the resource mapping information is used to indicate the RE to which the terminal performs mapping in each RMB in the first RMB set.

In a possible design, the resource mapping information is obtained based on a resource mapping matrix, the resource mapping matrix is an M×N matrix, M is a positive integer, N is a positive integer, and the resource mapping matrix includes a plurality of interleaved sequences, where each of the plurality of interleaved sequences is obtained based on the base sequence by using a preset algorithm, and the plurality of interleaved sequences include the first interleaved sequence.

Optionally, at least one interleaved sequence corresponding to one row of elements in the resource mapping matrix is allocated to the terminal for use, where an interleaved sequence corresponding to an element in an $i^{th}$ column of the row is used to determine an RE to which the terminal performs mapping in each RMB in an $i^{th}$ RMB set; or at least one interleaved sequence corresponding to one column of elements in the resource mapping matrix is allocated to the terminal for use, where an interleaved sequence corresponding to an element in a $j^{th}$ row of the column is used to determine an RE to which the terminal performs mapping in each RMB in a $j^{th}$ RMB set.

In a possible design, the transmission module is further configured to transmit the information on an RE mapped in an RMB in a second RMB set, where the RE to which the terminal performs mapping in each RMB in the second RMB set is determined based on a second interleaved sequence, the second interleaved sequence is an interleaved sequence in the resource mapping matrix, the second RMB set and the first RMB set have at least one different RE, and the second interleaved sequence and the first interleaved sequence have at least one different element.

It should be noted that, in the sixth aspect, the transmission module has a function of the receiving module. In other words, the terminal may receive, via the transmission module, information sent by another network element.

In a possible design of the first aspect, the second aspect, the third aspect, the fourth aspect, the fifth aspect, or the sixth aspect, the base sequence satisfies the following relationship:

$\pi = [\alpha_1, \alpha_2, \ldots, \alpha_J]$, where $\pi$ is the base sequence, and a value of an element $\alpha_j$ in the base sequence is an integer.

In a possible design of the first aspect, the second aspect, the third aspect, the fourth aspect, the fifth aspect, or the sixth aspect, the resource mapping matrix satisfies the following relationship:

$$A = \begin{bmatrix} \pi_{1,1} & \pi_{1,2} & \ldots & \pi_{1,C} \\ \pi_{2,1} & \pi_{2,2} & \ldots & \pi_{2,C} \\ \ldots & \pi_{n,c} & \ldots & \ldots \\ \pi_{N,1} & \pi_{N,2} & \ldots & \pi_{N,C} \end{bmatrix},$$

A is the resource mapping matrix, and a sequence $\pi_{n,c}$ is an interleaved sequence used by a terminal n to perform mapping to an RE in each RMB in a $C^{th}$ RMB set, or a sequence $\pi_{n,c}$ is an interleaved sequence used by a terminal c to perform mapping to an RE in each RMB in an $n^{th}$ RMB set.

When the sequence $\pi_{n,c}$ is the interleaved sequence used by the terminal n to perform mapping to the RE in each RMB in the $C^{th}$ RMB set, an element in $\pi_{n,c}$ is used to indicate a mapping vector used by the terminal n to perform mapping to the RE in each RMB in the $c^{th}$ RMB set, and the mapping vector is used to indicate a location of the RE to which a modulation symbol of the terminal n is mapped in each RMB in the $c^{th}$ RMB set; or an element in $\pi_{n,c}$ is used to indicate a location of the RE to which a modulation symbol of the terminal n is mapped in each RMB in the $C^{th}$ RMB set, and the terminal n is any one of the at least one terminal.

When the sequence $\pi_{n,c}$ is the interleaved sequence used by the terminal C to perform mapping to the RE in each RMB in the $n^{th}$ RMB set, an element in $\pi_{n,c}$ is used to indicate a mapping vector used by the terminal c to perform mapping to the RE in each RMB in the $n^{th}$ RMB set, and the mapping vector is used to indicate a location of the RE to which a modulation symbol of the terminal c is mapped in each RMB in the $n^{th}$ RMB set; or an element in $\pi_{n,c}$ is used to indicate a location of the RE to which a modulation symbol of the terminal c is mapped in each RMB in the $n^{th}$ RMB set, and the terminal C is any one of the at least one terminal.

In a possible design of the first aspect, the second aspect, the third aspect, the fourth aspect, the fifth aspect, or the sixth aspect, the preset algorithm is a cyclic shift algorithm.

In a possible design of the first aspect, the second aspect, the third aspect, the fourth aspect, the fifth aspect, or the sixth aspect, the base sequence is one of the following sequences: a natural sequence, an extended sequence of the natural sequence, a bit reversal sequence of the natural sequence, an extended sequence of the bit reversal sequence, and a fixed sequence.

In a possible design of the first aspect, the second aspect, the third aspect, the fourth aspect, the fifth aspect, or the sixth aspect, the mapping vector satisfies the following relationship:

$$\text{re\_vec} = \begin{bmatrix} w_1 \\ w_2 \\ w_m \\ M \\ w_L \end{bmatrix},$$

where re_vec is the mapping vector, L is a quantity of REs included in each RMB, $w_m$ is a weight required for mapping one modulation symbol of a fifth terminal to an $m^{th}$ RE in one RMB, and the fifth terminal is any one of the at least one terminal.

According to a seventh aspect, this application provides a resource mapping apparatus. The resource mapping apparatus has a function of implementing the resource mapping method according to any one of the first aspect or the second aspect. The function may be implemented by hardware, or may be implemented by hardware executing corresponding software. The hardware or the software includes one or more modules corresponding to the function.

According to an eighth aspect, a resource mapping apparatus is provided, and the apparatus includes a processor and a memory. The memory is configured to store a computer-executable instruction, and when the resource mapping apparatus runs, the processor executes the computer-executable instruction stored in the memory, so that the resource mapping apparatus performs the resource mapping method according to any one of the first aspect or the second aspect.

According to a ninth aspect, a resource mapping apparatus is provided, and the apparatus includes a processor. The processor is configured to: after being coupled to a memory and reading an instruction in the memory, perform the resource mapping method according to any one of the first aspect or the second aspect according to the instruction.

According to a tenth aspect, a computer-readable storage medium is provided. The computer-readable storage medium stores an instruction, and when the instruction is run on a computer, the computer is enabled to perform the resource mapping method according to any one of the first aspect or the second aspect.

According to an eleventh aspect, a computer program product including an instruction is provided. When the computer program product runs on a computer, the computer is enabled to perform the resource mapping method according to any one of the first aspect or the second aspect.

According to a twelfth aspect, a circuit system is provided. The circuit system includes a processing circuit, and the processing circuit is configured to perform the resource mapping method according to any one of the first aspect or the second aspect.

According to a thirteenth aspect, a chip is provided. The chip includes a processor, the processor is coupled to a memory, the memory stores a program instruction, and when the program instruction stored in the memory is executed by the processor, the resource mapping method according to any one of the first aspect or the second aspect is implemented.

According to a fourteenth aspect, a resource mapping system is provided. The resource mapping system includes the terminal (or the chip of the terminal) and the access network device (or the chip of the access network device) according to the foregoing aspects.

For technical effects brought by any design manner in the second aspect to the fourteenth aspect, refer to technical effects brought by different design manners in the first aspect. Details are not described herein again.

DESCRIPTION OF EMBODIMENTS

Figure 1:
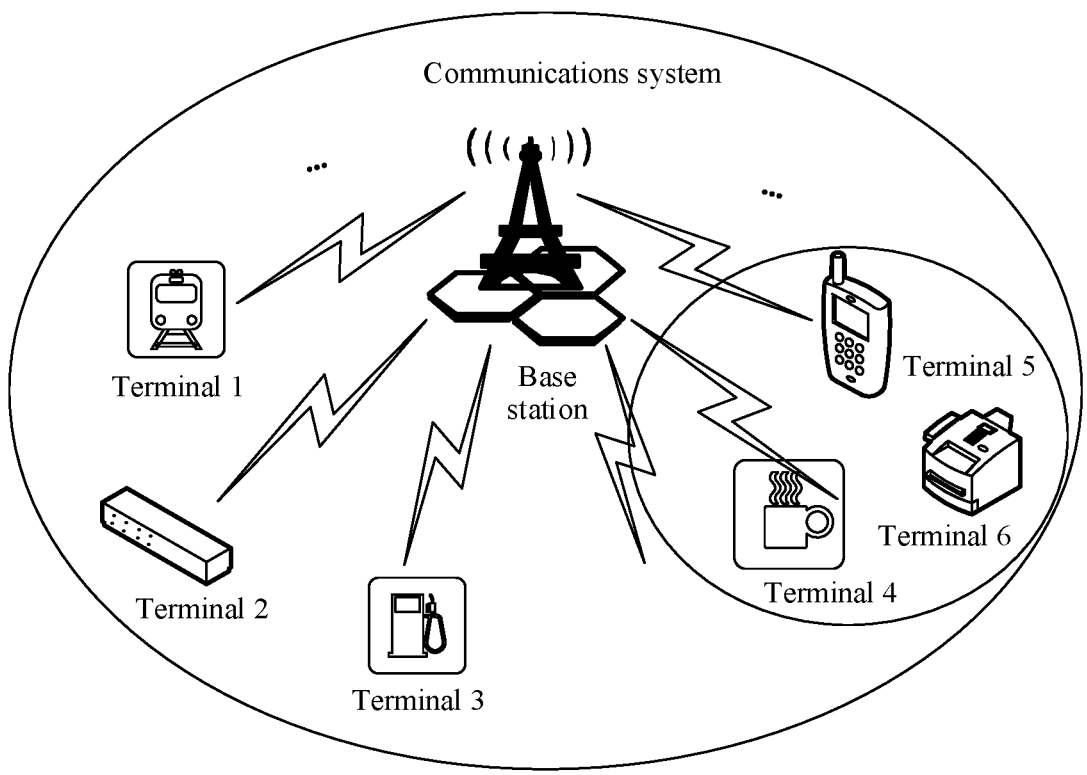
FIG. 1 is a schematic architectural diagram of a communications system according to an embodiment of this application.

A schematic architectural diagram of a communications system according to an embodiment of this application is first provided. As shown in FIG. 1, the communications system includes an access network device and a plurality of terminals (e.g., a terminal 1 to a terminal 6 in FIG. 1) that communicate with the access network device.

The access network device is an apparatus that is deployed in a radio access network and that is configured to provide a wireless communication function. The access network device in this embodiment of this application may include but is not limited to macro base stations, micro base stations (which are also referred to as small cells), relay stations, transmission reception points (TRP), next generation network nodes (gNodeB, gNB), evolved NodeBs connected to a next generation core network (ng-eNB), and the like that are in various forms, and may further include a radio access network device in a non-3GPP system such as a wireless local area network (WLAN) access device.

A terminal is mainly configured to receive or send data. Optionally, the terminal in this embodiment of this application may include but is not limited to various handheld devices, vehicle-mounted devices, wearable devices, and computing devices that have a wireless communication function, or other processing devices connected to a wireless modem, and may further include a subscriber unit, a cellular phone, a smart phone, a wireless data card, a personal digital assistant (PDA) computer, a tablet, a handheld device, a laptop computer, a machine type communication (MTC) terminal, user equipment (UE), and the like. For ease of description, in this application, the devices mentioned above are collectively referred to as terminals.

The foregoing communications system may be used in a current long term evolution (LTE) system or a current long term evolution-advanced (LTE-A) system, or may be used in a 5G network that is currently being formulated or another future network. This is not specifically limited in the embodiments of this application. In different networks, the access network device and the terminal in the foregoing communications system may correspond to different names. A person skilled in the art may understand that the names constitute no limitation on the devices.

In the specification and the accompanying drawings of this application, the terms "first", "second", and the like are used to distinguish between different objects or distinguish between different processing of a same object, but are not used to describe a particular order of the objects. The character "/" means "or" unless otherwise specified. For example, A/B may represent A or B. In this specification, the term "and/or" describes only an association relationship for describing associated objects and represents that three relationships may exist. For example, A and/or B may represent the following three cases: Only A exists, both A and B exist, and only B exists. The term "at least one" includes two cases: one and at least two. In addition, the terms "including" and "having", and any other variant thereof mentioned in the descriptions of this application are intended to cover non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device. It should be noted that in the embodiments of this application, the word such as "example" or "for example" is used to represent giving an example, an illustration, or a description. Any embodiment or design scheme described as the word "example" or "for example" in the embodiments of this application should not be explained as being more preferred or having more advantages than another embodiment or design scheme. Exactly, use of the word "example", "for example", or the like is intended to present a relative concept in a specific manner.

Figure 2:
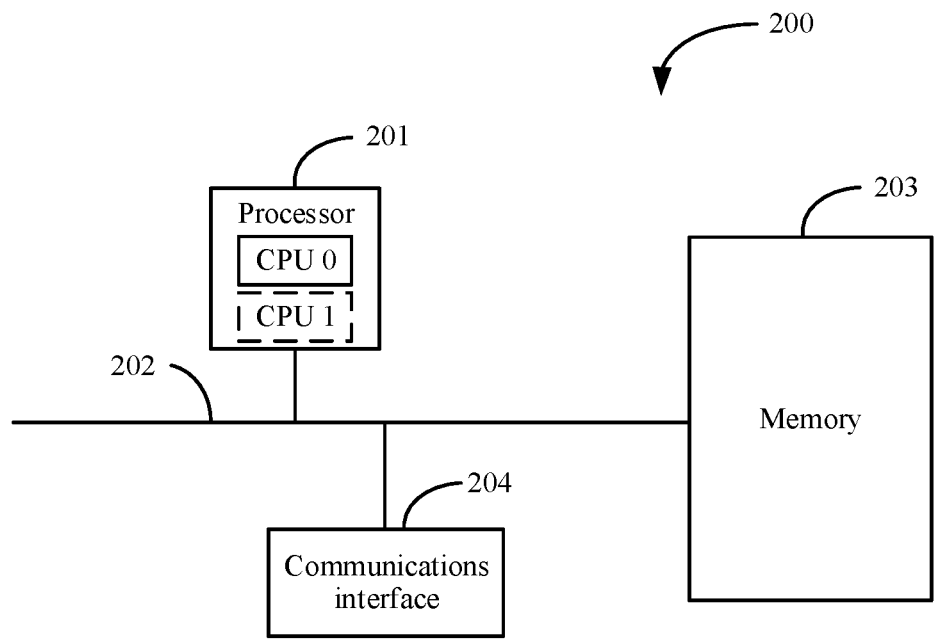
FIG. 2 is a schematic structural diagram of a communications device according to an embodiment of this application.

Optionally, the terminal or the access network device in the embodiments of this application may be implemented by using a communications device in FIG. 2. FIG. 2 is a schematic diagram of a hardware structure of a communications device according to an embodiment of this application. A communications device 200 includes at least one processor 201, a communications line 202, a memory 203, and at least one communications interface 204.

The processor 201 may be a general-purpose central processing unit (CPU), a microprocessor, an application-specific integrated circuit (ASIC), or one or more integrated circuits that are configured to control execution of a program in a solution of this application.

The communications line 202 may include a path for transmitting information between the foregoing components.

The communications interface 204 uses any apparatus such as a transceiver, to communicate with another device or a communications network, for example, the Ethernet, a radio access network (RAN), or a wireless local area network (WLAN).

The memory 203 may be a read-only memory (ROM) or another type of static storage device that can store static information and an instruction, a random access memory (RAM) or another type of dynamic storage device that can store information and an instruction, or may be an electrically erasable programmable read-only memory (EEPROM), a compact disc read-only memory (CD-ROM) or another compact disc storage, an optical disc storage (including a compact optical disc, a laser disc, an optical disc, a digital versatile disc, a Blu-ray disc, and the like), a magnetic disk storage medium or another magnetic storage device, or any other medium that can be used to carry or store expected program code in a form of an instruction or a data structure and that can be accessed by a computer. However, the memory 203 is not limited thereto. The memory may exist independently, and is connected to the processor through the communications line 202. The memory may alternatively be integrated with the processor.

The memory 203 is configured to store a computer-executable instruction for executing the solution in this embodiment of this application, and the processor 201 controls the execution. The processor 201 is configured to execute the computer-executable instruction stored in the memory 203, to implement a resource mapping method provided in the following embodiments of this application. For example, the processor 201 is configured to execute a computer-executable instruction that has functions of channel encoding, channel decoding, modulation, demodulation, and resource mapping, to perform channel encoding, modulation, and resource mapping on information.

Certainly, the functions of channel encoding, channel decoding, modulation, demodulation, and resource mapping mentioned above may be further implemented as a channel encoding unit, a channel decoding unit, a modulation unit, a demodulation unit, and a resource mapping unit that are in the communications device. Different units may be specifically constructed by using different logic circuits, and are not shown in FIG. 2.

Optionally, in this embodiment of this application, the computer-executable instruction may also be referred to as application program code. This is not specifically limited in this embodiment of this application.

In specific implementation, in an embodiment, the processor 201 may include one or more CPUs, for example, a CPU 0 and a CPU 1 in FIG. 2.

In specific implementation, in an embodiment, the communications device 200 may include a plurality of processors. Each of the processors may be a single-core processor, or may be a multi-core processor. The processor herein may be one or more devices, circuits, and/or processing cores for processing data (e.g., a computer program instruction).

It may be understood that FIG. 2 shows only an example of a schematic diagram of a hardware structure of the communications device. To implement the technical solution in this embodiment of this application, the communications device 200 may further include another component. This is not limited in this embodiment of this application.

The foregoing communications device 200 may be a general-purpose device or a dedicated device. In specific implementation, the communications device 200 may be a device having a structure similar to that in FIG. 2. A type of the communications device 200 is not limited in this embodiment of this application.

Figure 3:
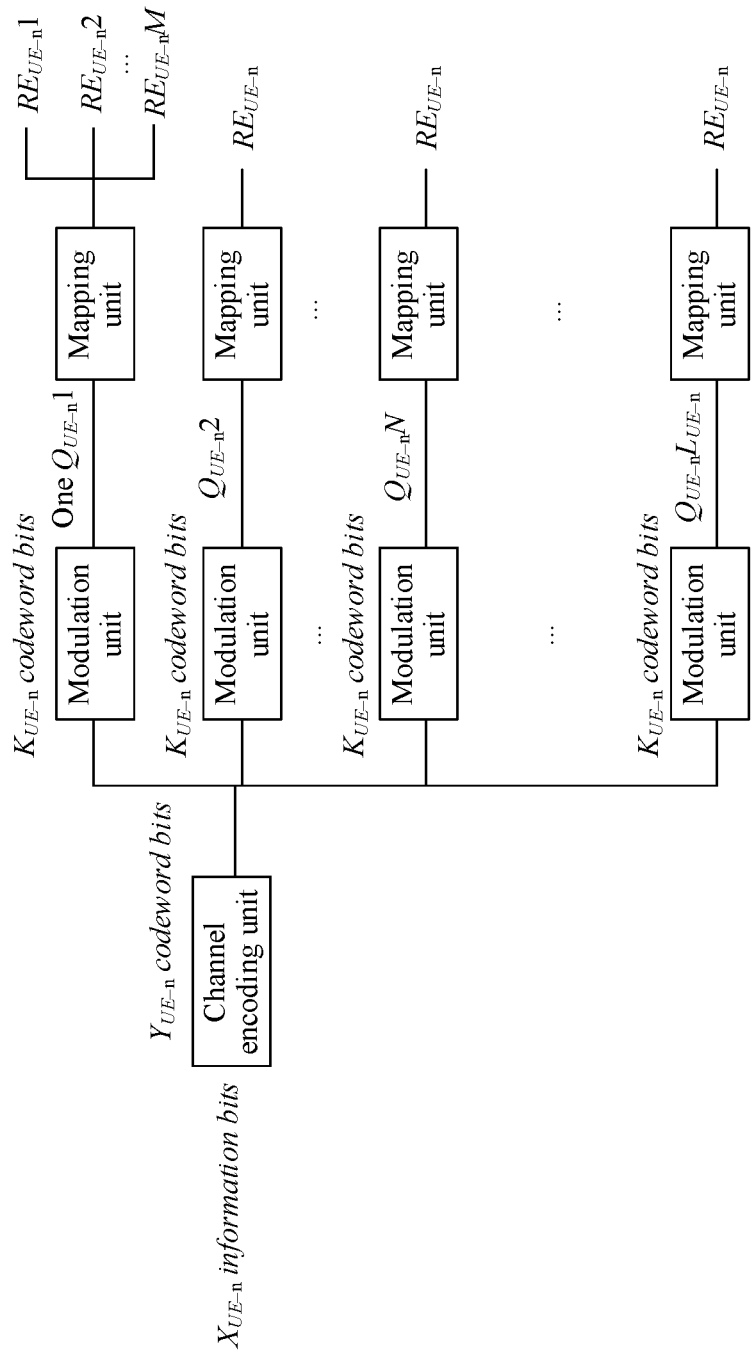
FIG. 3 is a schematic diagram of a principle of resource mapping according to an embodiment of this application.

As shown in FIG. 3, a general procedure of a resource mapping method according to an embodiment of this application is first provided from a perspective of a transmitting end.

A channel encoding unit encodes $X_{UE-n}$ information bits into $Y_{UE-n}$ codeword bits, where UE-n represents an $n^{th}$ terminal (namely, the UE mentioned above), and a value of n is a positive integer. The $Y_{UE-n}$ codeword bits are then input into a plurality of modulation units, and a quantity of input codeword bits of each modulation unit is $K_{UE-n} = Y_{UE-n}/P$, where P is a quantity of the modulation units. Each modulation unit modulates the $K_{UE-n}$ codeword bits into one modulation symbol (which is represented by $Q_{UE-n}$), and the P modulation units modulate the $Y_{UE-n}$ codeword bits into $L_{UE-n}$ modulation symbols (a modulation symbol $Q_{UE-n}1$ to a modulation symbol $Q_{UE-n}L_{UE-n}$). The modulation symbols are then input to a resource mapping unit, and the mapping unit maps one modulation symbol to one or more REs.

Figure 11:
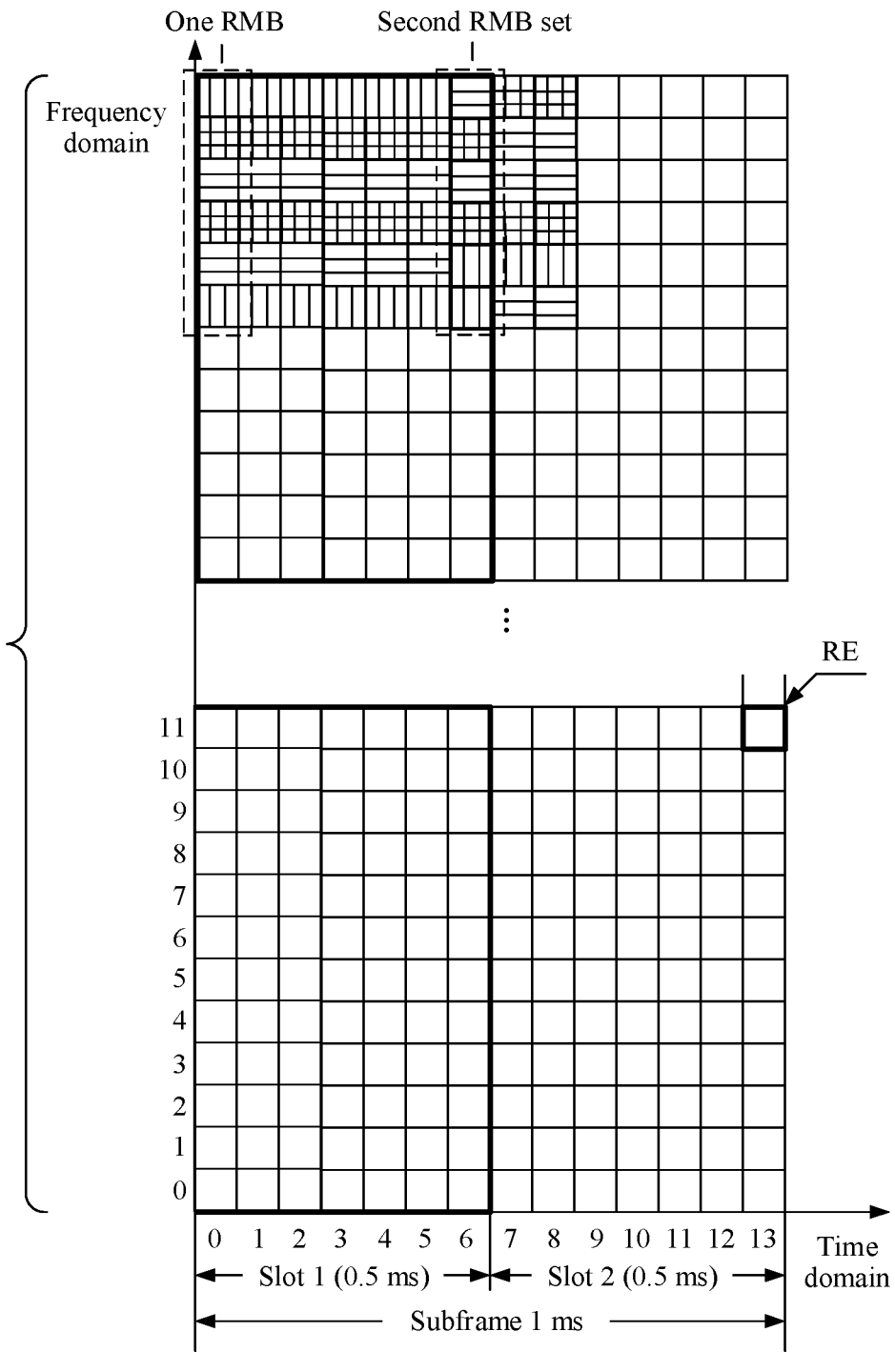
FIG. 11 is a schematic diagram of a specific scenario of resource mapping according to an embodiment of this application.

In this embodiment of this application, a terminal may transmit a modulation symbol in $T_{UE-n}$ RMBs, and each RMB includes $M_{UE-n}$ REs. Therefore, a quantity of modulation symbols transmitted by the terminal in each RMB is $N_{UE-n}L_{UE-n}/T_{UE-n}$. The RMB refers to a resource mapping block including at least one RE. For example, for division into a plurality of RMBs based on a channel coding frame, refer to FIG. 11. FIG. 11 shows an example of division into RMBs in a channel coding subframe, where one RMB may include six REs, that is, a value of $M_{UE-n}$ is 6. Certainly, division into a plurality of RMBs may alternatively be based on a transport block (TB) or a code block (CB). For a principle of the division, refer to a manner of division into RMBs based on a channel coding frame. Details are not described again herein.

Figure 4:
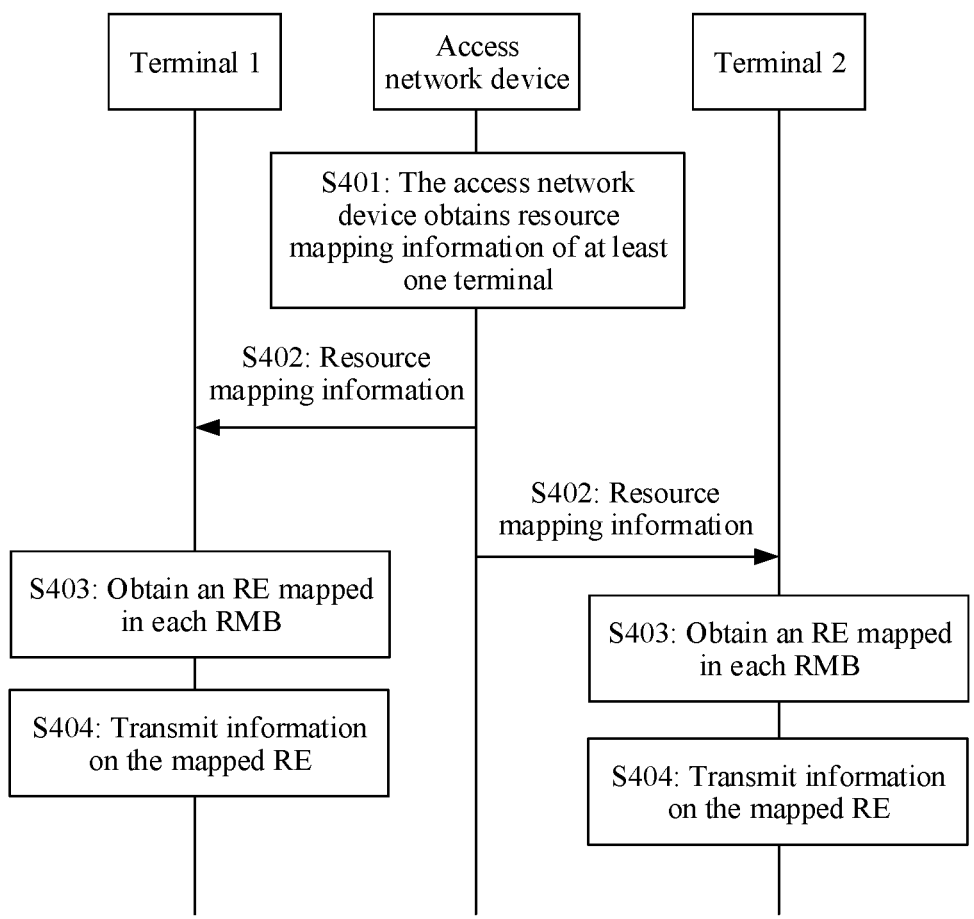
FIG. 4 is a flowchart of a resource mapping method according to an embodiment of this application.

A resource mapping method provided in an embodiment of this application may be used in a scenario in which REs are configured for a plurality of terminals. The following embodiment mainly describes the method by using an example of two terminals: a terminal 1 and a terminal 2 that are shown in FIG. 1 in the plurality of terminals. As shown in FIG. 4, the resource mapping method provided in this embodiment of this application includes the following steps.

S401: An access network device obtains resource mapping information of a terminal.

The resource mapping information of the terminal is used to indicate an RE to which the terminal performs mapping in each RMB.

Figure 5:
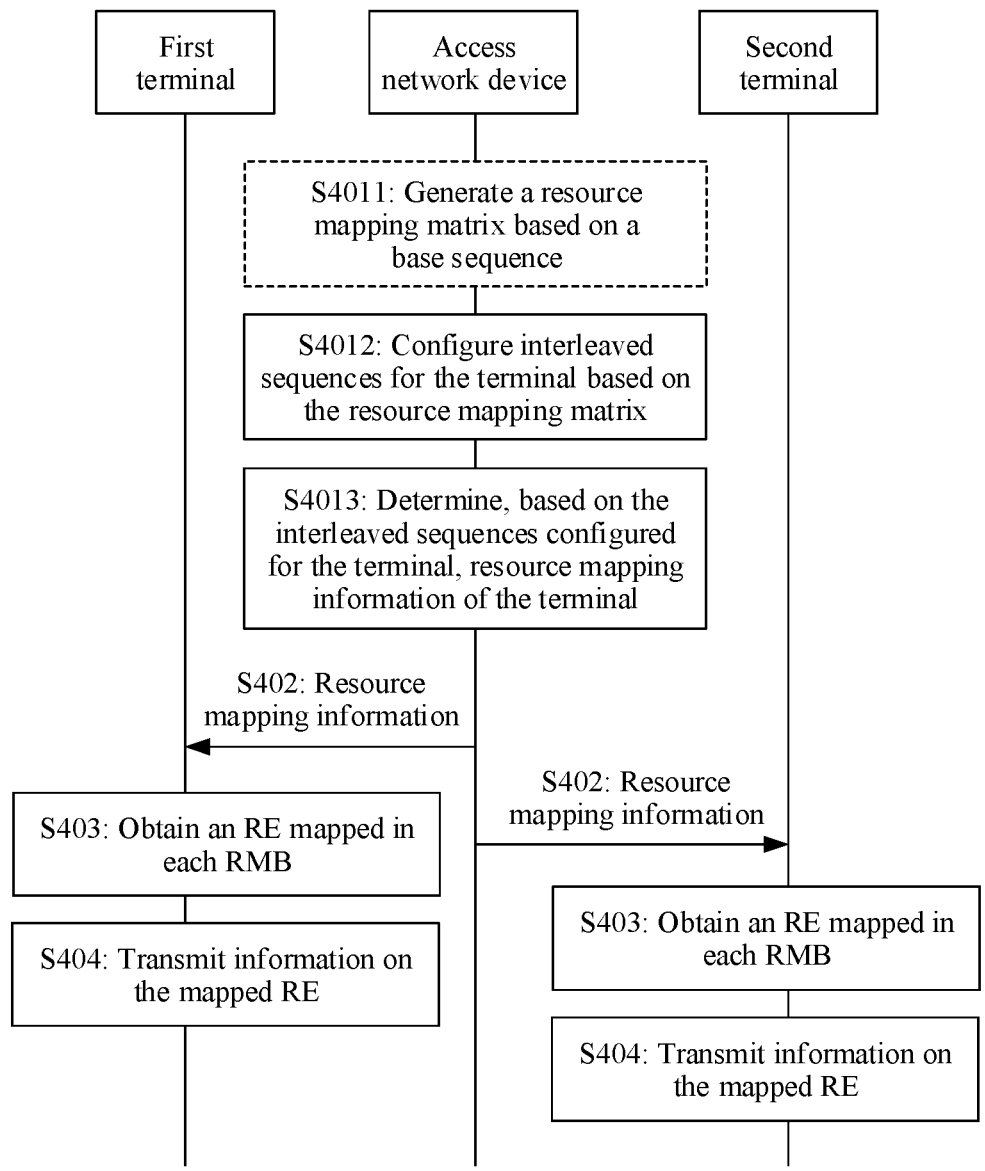
FIG. 5 is a flowchart of a resource mapping method according to an embodiment of this application.

Specifically, as shown in FIG. 5, S401 may be implemented as the following steps S4011 to S4013.

(Optional) S4011: The access network device generates a resource mapping matrix based on a base sequence.

The base sequence satisfies the following relationship: $\pi=[\alpha_1, \alpha_2, \ldots, \alpha_J]$, where $\pi$ is the base sequence, a value of an element $\alpha_j$ in the base sequence is an integer, and J is a quantity of elements included in the base sequence. The resource mapping matrix is an M×N matrix, where M is a positive integer, and N is a positive integer.

Optionally, the base sequence may include but is not limited to the following sequences or subsequences of the following sequences:

1. A natural sequence, for example, a base sequence $\pi=\Omega=[0, 1, 2, \ldots, J-1]$, where $\Omega$ is a natural sequence.

2. An extended sequence of the natural sequence: $\pi=[\Omega, \text{perm}_1(\Omega), \text{perm}_2(\Omega), \ldots, \text{perm}_t(\Omega)]$, where $\text{perm}_t(\Omega)$ is a $t^{th}$ re-sorted sequence of the natural sequence $\Omega$. A re-sorted sequence is a sequence obtained by re-sorting elements in a sequence. For example, a sequence is $\eta=[1, 2, 3, 4]$, a re-sorted sequence of the sequence is, for example, $\eta_1=[2, 3, 4, 1]$, and another re-sorted sequence of the sequence is, for example, $\eta_2=[3, 2, 4, 1]$. When quantities of elements included in sequences are different, quantities of re-sorted sequences of the sequences may be different. For example, for a sequence including three elements, a quantity of re-sorted sequences of the sequence may be, for example, $A_3^3-1=5$, and for a sequence including four elements, a quantity of re-sorted sequences of the sequence may be, for example, $A_4^4-1=23$.

3. A bit reversal sequence of the natural sequence: $\pi=[\text{BitRev}(\Omega)]$, where BitRev ($\Omega$) may be obtained based on BitRev ($\Omega'$).

BitRev ($\Omega'$)=$[\beta(0), \beta(1), \beta(2), \ldots, \beta(\Omega'-1)]$, where $\beta(i)$ is a bit reversal value of i. To be specific, when a binary expansion of i is $(b_{n-1}, \ldots, b_1, b_0)$, a binary expansion of $\beta(i)$ is $(b_0, b_1, \ldots, b_{n-1})$. $\Omega'$ is a quantity of elements in the sequence BitRev ($\Omega'$). $\Omega'=2^{ceil(Log_2(J))}$, where ceil( ) is a ceiling function. $2^{ceil(Log_2(J))}$ is a minimum value that is of integral powers of 2 and that is greater than J.

All elements that are less than J and that are in BitRev ($\Omega'$) are then selected in a specific order to be elements in BitRev ($\Omega$).

For example, when a value of J is 3, the base sequence includes three elements. It is assumed that the base sequence is $\pi=[0,1,2]$. The quantity $\Omega'$ of elements in the sequence BitRev ($\Omega'$) is calculated first. In the integral powers of 2 (such as 1, 2, 4, 8, and 16), the minimum value greater than J (3) is 4. Therefore, a value of $\Omega'$ is 4.

BitRev ($\Omega'$)=BitRev (4)=$[\beta(0), \beta(1), \beta(2), \beta(3)]$ is then calculated. Because a binary expansion of 0 to 3 is sequentially (00, 01, 10, 11), a binary expansion of $\beta(0)$ to $\beta(3)$ is sequentially (00, 10, 01, 11), and BitRev (4)=[0, 2, 1, 3]. It is assumed that elements that are in BitRev (4) and that are less than J (3) are selected in a left-to-right order, and a finally obtained bit reversal sequence of the natural sequence is as follows:

$\pi=[\text{BitRev}(\Omega)]=[\text{BitRev}(3)]=[0,2,1]$.

4. An extended sequence of the bit reversal sequence:

$\pi=[\text{BitRev}(\Omega), \text{perm}_1(\text{BitRev}(\Omega)), \text{perm}_2(\text{BitRev}(\Omega)), \ldots, \text{perm}_t(\text{BitRev}(\Omega))]$, where BitRev ($\Omega$) is the bit reversal sequence of the natural sequence $\Omega$, and $\text{perm}_t(\text{BitRev}(\Omega))$ is a $t^{th}$ re-sorted sequence of BitRev ($\Omega$).

5. A pseudo-random sequence is a sequence generated by using a pre-specified random seed.

6. A fixed sequence: When a quantity of REs included in one RMB is given, it is specified that the sequence may include but is not limited to any one of the following sequences.

If one RMB includes two REs, the fixed sequence is, for example:

[1, 2, 2, 1, 1, 2, 2, 1, 1, 2, 2, 1, 1, 2, 2, 1, . . . , 1, 2, 2, 1].

If one RMB includes four REs, the fixed sequence is, for example:

[1, 2, 3, 4, 1, 3, 2, 4, 1, 4, 2, 3, 1, 2, 3, 4, 1, 3, 2, 4, 1, 4, 2, 3, 1, 2, 3, 4, . . . , 1, 2, 3, 4, 1, 3, 2, 4, 1, 4, 2, 3].

If one RMB includes five REs, the fixed sequence is, for example:

[1, 2, 3, 4, 5, 1, 3, 5, 2, 4, 1, 2, 5, 3, 4, 1, 5, 3, 2, 4, 1, 2, 4, 3, 5, 1, 2, 3, 4, 5, . . . , 1, 2, 3, 4, 5, 1, 3, 5, 2, 4, 1, 2, 5, 3, 4, 1, 5, 3, 2, 4, 1, 2, 4, 3, 5].

If one RMB includes six REs, the fixed sequence is, for example:

[1, 2, 3, 4, 5, 6, 1, 3, 5, 2, 4, 6, 1, 2, 5, 3, 4, 6, 1, 2, 6, 3, 4, 5, 1, 2, 4, 3, 5, 6, 1, 2, 3, 4, 5, 6, . . . , 1, 2, 3, 4, 5, 6, 1, 3, 5, 2, 4, 6, 1, 2, 5, 3, 4, 6, 1, 2, 6, 3, 4, 5, 1, 2, 4, 3, 5, 6].

If one RMB includes eight REs, the fixed sequence is, for example:

[1, 2, 3, 4, 5, 6, 7, 8, 1, 3, 5, 7, 2, 4, 6, 8, 1, 4, 5, 8, 2, 3, 6, 7, 1, 2, 5, 6, 3, 4, 7, 8, 1, 2, 3, 5, 4, 6, 7, 8, 2, 3, 4, 6, 1, 5, 7, 8, 1, 2, 3, 4, 5, 6, 7, 8, . . . , 1, 2, 3, 5, 4, 6, 7, 8, 1, 3, 5, 7, 2, 4, 6, 8, 1, 4, 5, 8, 2, 3, 6, 7, 1, 2, 5, 6, 3, 4, 7, 8, 1, 2, 3, 5, 4, 6, 7, 8].

If one RMB includes twelve REs, the fixed sequence is, for example:

[1, 2, 3, 4, 5, 6, 7, 8, 9, 10, 11, 12, 1, 3, 5, 7, 9, 11, 2, 4, 6, 8, 10, 12, 1, 4, 5, 8, 9, 12, 2, 3, 6, 7, 10, 11, 1, 2, 5, 6, 9, 10, 3, 4, 7, 8, 11, 12, 1, 2, 3, 5, 6, 9, 4, 7, 8, 10, 11, 12, 1, 2, 3, 4, 5, 6, 7, 8, 9, 10, 11, 12, . . . , 1, 2, 3, 4, 5, 6, 7, 8, 9, 10, 11, 12, 1, 3, 5, 7, 9, 11, 2, 4, 6, 8, 10, 12, 1, 4, 5, 8, 9, 12, 2, 3, 6, 7, 10, 11, 1, 2, 5, 6, 9, 10, 3, 4, 7, 8, 11, 12, 1, 2, 3, 5, 6, 9, 4, 7, 8, 10, 11, 12].

Certainly, the foregoing fixed sequence may alternatively be in another form. For example, when one RMB includes four REs, the fixed sequence may alternatively be, for example, as follows:

[1, 2, 3, 4, 1, 4, 2, 3, 1, 3, 2, 4, 1, 2, 3, 4, . . . , 1, 2, 3, 4, 1, 4, 2, 3, 1, 3, 2, 4, 1, 2, 3, 4].

In other words, because quantities of elements included in the fixed sequence are different, the fixed sequence may be alternatively extended to another form. The foregoing merely lists a limited quantity of forms for brief description.

Optionally, the foregoing natural sequence may alternatively be $\pi=\Omega=[1, 2, \ldots, J]$, or may be a sequence in another form. Correspondingly, another sequence obtained based on the sequence is different from the sequences listed above.

As mentioned above, any one of the foregoing sequences in 1 to 6 or one subsequence of any one of the sequences in 1 to 6 may be selected as the base sequence. Optionally, if the quantity of elements included in the base sequence is given, J elements in any one of the foregoing sequences may be selected as elements in the base sequence. Optionally, first J elements in any one of the foregoing sequences are selected as elements in the base sequence, or last J elements in any one of the foregoing sequences are selected as elements in the base sequence, or J elements in the middle of any one of the foregoing sequences are selected as elements in the base sequence. Alternatively, J elements in any one of the foregoing sequences are selected, at a preset fixed interval, as elements in the base sequence, or any J elements in any one of the foregoing sequences are selected as elements in the base sequence. A manner of selecting the elements in the base sequence is not specifically limited in this embodiment of this application. In addition to a manner of selecting the base sequence by the access network device, the base sequence may also be specified in a protocol.

Optionally, the quantity of elements J in the base sequence may include but is not limited to an integer multiple of the quantity of REs included in one RMB, an integer multiple of a quantity of terminals that multiplex one RMB, and a quantity of all to-be-mapped modulation symbols in one RMB. This is not limited in this embodiment of this application.

Optionally, the base sequence may be selected by the access network device based on a policy of the access network device, or may be pre-specified in a protocol. This is not limited in this embodiment of this application.

This embodiment of this application provides a plurality of forms of base sequences. The access network device may randomly select any one of the base sequences as the base sequence used for resource mapping. Because there are variants of the base sequence that can be selected, it is not easy for a third party to steal the base sequence, thereby improving security of transmitting information through RE mapping based on the base sequence.

The access network device performs, according to a preset rule, a cyclic shift operation on the selected base sequence or the base sequence pre-specified in the protocol, to obtain different interleaved sequences, so as to generate a resource mapping matrix.

For example, the resource mapping matrix satisfies the following relationship:

$$A = \begin{bmatrix} \pi_{1,1} & \pi_{1,2} & \ldots & \pi_{1,C} \\ \pi_{2,1} & \pi_{2,2} & \ldots & \pi_{2,C} \\ \ldots & \pi_{n,c} & \ldots & \ldots \\ \pi_{N,1} & \pi_{N,2} & \ldots & \pi_{N,C} \end{bmatrix},$$

where

A is the resource mapping matrix, and each element in the resource mapping matrix corresponds to one interleaved sequence.

Optionally, a plurality of interleaved sequences corresponding to each row of elements in the resource mapping matrix are allocated to one terminal for use. An interleaved sequence corresponding to an element in an $i^{th}$ column of the row is used to determine an RE to which the terminal performs mapping in each RMB in an $i^{th}$ RMB set. Specifically, a sequence $\pi_{n,c}$ is an interleaved sequence used by a terminal n to perform mapping to an RE in each RMB in a $c^{th}$ RMB set. In other words, interleaved sequences used by the terminal to perform mapping to the RE in RMBs in the $c^{th}$ RMB set are the same. Correspondingly, REs occupied by the terminal to transmit information in the RMBs in the RMB set are the same. For example, if the $C^{th}$ RMB set includes three RMBs, the terminal uses an interleaved sequence 1 to perform mapping to an RE in the first RMB, uses the interleaved sequence 1 to perform mapping to an RE in the second RMB, and also uses the interleaved sequence 1 to perform mapping to an RE in the third RMB.

Optionally, in the resource mapping matrix, a plurality of interleaved sequences corresponding to each column of elements in the resource mapping matrix are allocated to one terminal for use. An interleaved sequence corresponding to an element in a $j^{th}$ row of the column is used to determine an RE to which the terminal performs mapping in each RMB in a $j^{th}$ RMB set. In this case, a sequence if $\pi_{n,c}$ in A is an interleaved sequence used by a terminal C to perform mapping to an RE in each RMB in an $n^{th}$ RMB set. The terminal f or the terminal c is any one of terminals served by the access network device, and includes but is not limited to the terminals in the communications system in FIG. 1.

The following mainly uses an example in which the plurality of interleaved sequences corresponding to one row of elements in the resource mapping matrix are allocated to one terminal for description. This is uniformly described herein, and details are not described in the following again.

An element in the interleaved sequence $\pi_{n,c}$ may indicate an RE occupied by the terminal to transmit information. This embodiment of this application provides the following two manners of indicating an RE by using the interleaved sequence $\pi_{n,c}$:

Manner 1: The interleaved sequence indirectly indicates the RE occupied by the terminal. The element in the interleaved sequence $\pi_{n,c}$ indicates a mapping vector used by the terminal n to perform mapping to the RE in each RMB in the $c^{th}$ RMB set, the mapping vector is selected from a mapping vector pool, and the mapping vector indicates a location of the RE to which a modulation symbol of the terminal n is mapped in each RMB in the $c^{th}$ RMB set.

The mapping vector pool is a set including all available mapping vectors, and all the terminals served by the access network device select mapping vectors from the mapping vector pool.

The mapping vector satisfies the following relationship:

$$re\_vec = \begin{bmatrix} w_1 \\ w_2 \\ w_m \\ M \\ w_L \end{bmatrix},$$

where re_vec is the mapping vector, L is a quantity of REs included in each RMB, and $w_m$ is a weight required for mapping one modulation symbol of the terminal to an $m^{th}$ RE in one RMB.

Manner 2: The interleaved sequence directly indicates the RE occupied by the terminal to transmit information. To be specific, the element in $\pi_{n,c}$ indicates a location of the RE to which a modulation symbol of the terminal f is mapped in each RMB in the $c^{th}$ RMB set.

Certainly, when the plurality of interleaved sequences corresponding to one column of elements are allocated to one terminal, in the foregoing resource mapping matrix A, an element in $\pi_{n,c}$ may indirectly indicate a location of an RE. To be specific, the element in $\pi_{n,c}$ indicates a mapping vector used by the terminal c to perform mapping to the RE in each RMB in the $n^{th}$ RMB set, and the mapping vector indicates a location of the RE to which a modulation symbol of the terminal c is mapped in each RMB in the $n^{th}$ RMB set. Alternatively, an element in $\pi_{n,c}$ directly indicates a location of the RE to which a modulation symbol of the terminal c is mapped in each RMB in the $n^{th}$ RMB set.

Figures 6, 7:
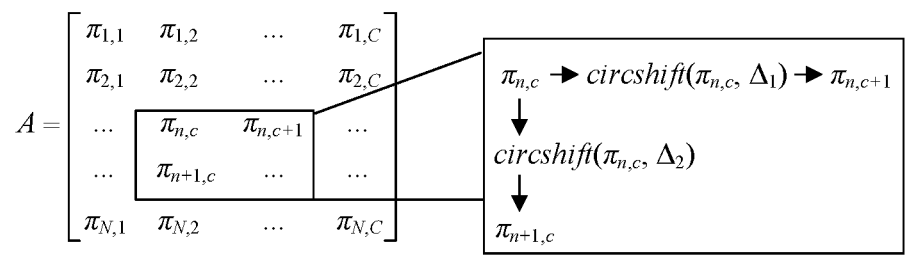
FIG. 6 is a schematic diagram of a principle of resource mapping matrix generation according to an embodiment of this application.
FIG. 7 is a schematic diagram of a mapping vector pool according to an embodiment of this application.

Optionally, a process of generating the resource mapping matrix may be represented by FIG. 6. The interleaved sequence corresponding to each element in the resource mapping matrix may be obtained by performing cyclic shift on the base sequence. $\pi_{n,c+1}$ and $\pi_{n+1,c}$ are used as examples. It is assumed that in the resource mapping matrix, a cyclic shift interval between interleaved sequences corresponding to elements in columns of each row is $\Delta_1$. For example, in the first row, a cyclic shift interval between sequences $\pi_{1,1}$ and $\pi_{1,2}$ is 2, that is, $\pi_{1,2}$ may be obtained after $\pi_{1,1}$ is cyclically shifted by 2 bits. A cyclic shift interval between interleaved sequences corresponding to elements in rows of each column is $\Delta_2$.

$\pi_{1,1}$ is first obtained by performing cyclic shift on the base sequence, and $\pi_{n,c+1}$ can then be obtained based on $\pi_{1,1}$ by using circshift($\pi_{1,1}$,(n−1)$\Delta_2$+c*$\Delta_1$), where circshift($\pi_{n,c}$,$\Delta$) indicates an operation in which the sequence $\pi_{n,c}$ is cyclically shifted by bits.

Similarly, $\pi_{n+1,c}$ can be obtained based on $\pi_{1,1}$ by using circshift($\pi_{1,1}$, n*$\Delta_2$+(c−1)$\Delta_1$).

Certainly, alternatively, cyclic shift may be performed on the base sequence to obtain an interleaved sequence at any location in the resource mapping matrix, and cyclic shift is then performed on the interleaved sequence to obtain all other interleaved sequences in the resource mapping matrix. A specific implementation of cyclic shift is not limited in this embodiment of this application.

Optionally, $\Delta_1$ may be set to a quantity of to-be-mapped modulation symbols of the terminal in one RMB, or an integer multiple of the modulation symbols, or may be set to a quantity of to-be-mapped REs of the terminal in one RMB, or may be set to another feasible value, or an integer multiple of the to-be-mapped REs. Similarly, a value of $\Delta_2$ can also be set.

It should be noted that in this embodiment of this application, S4011 is an optional step. To be specific, the resource mapping matrix in the access network device may be generated by the access network device according to S4011. Certainly, the access network device may not perform S4011. In this case, the resource mapping matrix may be pre-specified in a protocol.

S4012: The access network device configures interleaved sequences for different terminals based on the resource mapping matrix.

Optionally, the access network device randomly selects any row of elements in the resource mapping matrix, and configures a plurality of interleaved sequences corresponding to the row of elements for one terminal. For example, the access network device configures a plurality of interleaved sequences corresponding to elements in the first row in A for the terminal 1, where the interleaved sequence $\pi_{1,1}$ is an interleaved sequence used by the terminal 1 to perform mapping to an RE in each RMB in the first RMB set, $\pi_{1,2}$ is an interleaved sequence used by the terminal 1 to perform mapping to an RE in each RMB in the second RMB set, and the rest may be deduced by analogy. The access network device configures a plurality of interleaved sequences corresponding to elements in the eighth row in A for the terminal 2, where an interleaved sequence $\pi_{8,1}$ is an interleaved sequence used by the terminal 2 to perform mapping to an RE in each RMB in the first RMB set, $\pi_{8,2}$ is an interleaved sequence used by the terminal 2 to perform mapping to an RE in each RMB in the second RMB set, and the rest may be deduced by analogy.

Optionally, the access network device selects one row of elements in the resource mapping matrix in a polling manner, that is, selects one row of elements that are not used currently, and configures a plurality of interleaved sequences corresponding to the row of elements for one terminal.

Certainly, the access network device may alternatively select one row of elements in the resource mapping matrix in another manner, and configure a plurality of interleaved sequences corresponding to the row of elements for a terminal. This is not limited in this embodiment of this application.

S4013: The access network device determines, based on interleaved sequences configured for a terminal, resource mapping information of the terminal.

Optionally, the resource mapping information includes but is not limited to at least one of the following information: interleaved sequence index information, length (that is, a quantity of elements included in the interleaved sequences) information of the interleaved sequences, location information of an occupied RE, a quantity of occupied REs, a cyclic shift algorithm rule, the interleaved sequences used to indicate different RE locations and/or indexes of the interleaved sequences and/or quantities of the interleaved sequences, mapping vectors used to indicate different RE locations, quantities of the mapping vectors, indexes of the mapping vectors, a base sequence (or a base sequence index), and a quantity of RMBs included in each RMB set. The following mainly uses an example in which the resource mapping information is the interleaved sequence index information for description. This is uniformly described herein, and details are not described in the following again.

The access network device may determine, based on the interleaved sequences configured for the terminal, an interleaved sequence index of the terminal. For example, the interleaved sequence index of the terminal is a row number index of the interleaved sequences. For example, if the interleaved sequences configured by the access network device for the terminal are the plurality of interleaved sequences corresponding to the elements in the first row in the resource mapping matrix A, a value of the interleaved sequence index of the terminal is 1; if the interleaved sequences configured by the access network device for the terminal are a plurality of interleaved sequences corresponding to elements in the second row in the resource mapping matrix A, a value of the interleaved sequence index of the terminal is 2, and the rest may be deduced by analogy.

(Optional) S402: The access network device sends the resource mapping information to the terminal.

Correspondingly, the terminal receives the resource mapping information sent by the access network device.

Optionally, the access network device sends the resource mapping information to the terminal by using RRC signaling. For example, when establishing an RRC connection, the access network device sends the resource mapping information to the terminal. Alternatively, the access network device sends the resource mapping information to the terminal by using physical layer signaling. For example, the access network device sends the resource mapping information to the terminal through a physical downlink control channel (PDCCH). Alternatively, the access network device sends the resource mapping information to the terminal by using a broadcast message, for example, a master information block (MIB) message.

Certainly, the terminal may obtain, from the access network device, information such as the length (that is, the quantity of elements included in the interleaved sequences) information of the interleaved sequences, the location information of the occupied RE, the quantity of occupied REs, the cyclic shift algorithm rule, the base sequence, and the quantity of RMBs included in each RMB set. Alternatively, the foregoing information of the terminal may be pre-specified in a protocol. For example, the protocol pre-specifies the base sequence used for cyclic shift, and the cyclic shift algorithm rule. It should be noted that the base sequence and a base sequence used by the access network device are a same base sequence. The cyclic shift algorithm rule and a cyclic shift algorithm rule of the access network device are a same algorithm rule.

S403: The terminal obtains the RE mapped (occupied) during information transmission.

The RE occupied by the terminal to transmit information refers to an RE occupied by the terminal in each RMB when the terminal transmits the information by using each RMB.

In a possible implementation, the terminal stores a resource mapping matrix that is the same as that in the access network device. The resource mapping matrix may be specified in a protocol, and separately configured in the terminal and the access network device. Alternatively, the resource mapping matrix is generated by the access network device, and is configured for the terminal through signaling interaction between the access network device and the terminal.

It is assumed that to-be-mapped modulation symbols of both the terminal 1 and the terminal 2 in one RMB are 2, which are Q(UE-1, 1) and Q(UE-1, 2), and Q(UE-2, 1) and Q(UE-2, 2). UE-1 represents the terminal 1, UE-2 represents the terminal 2, and each modulation symbol is mapped to two REs. The mapping vector pool is a set {re_vec} of mapping vectors shown in FIG. 7. The mapping vector pool includes a plurality of mapping vector groups, each mapping vector group includes one or more mapping vectors, and each mapping vector may include a same quantity of elements or different quantities of elements. For example, mapping vectors $$\begin{bmatrix} w_1 \\ w_2 \\ 0 \\ 0 \\ 0 \\ 0 \end{bmatrix} \text{ and } \begin{bmatrix} 0 \\ 0 \\ 0 \\ w_4 \\ 0 \\ w_6 \end{bmatrix}$$

in {re_vec} may be classified as one mapping vector group.

The following describes, by using an example in which the resource mapping information is the interleaved sequence index information, how the terminal determines the occupied RE in the RMB.

Figure 8:
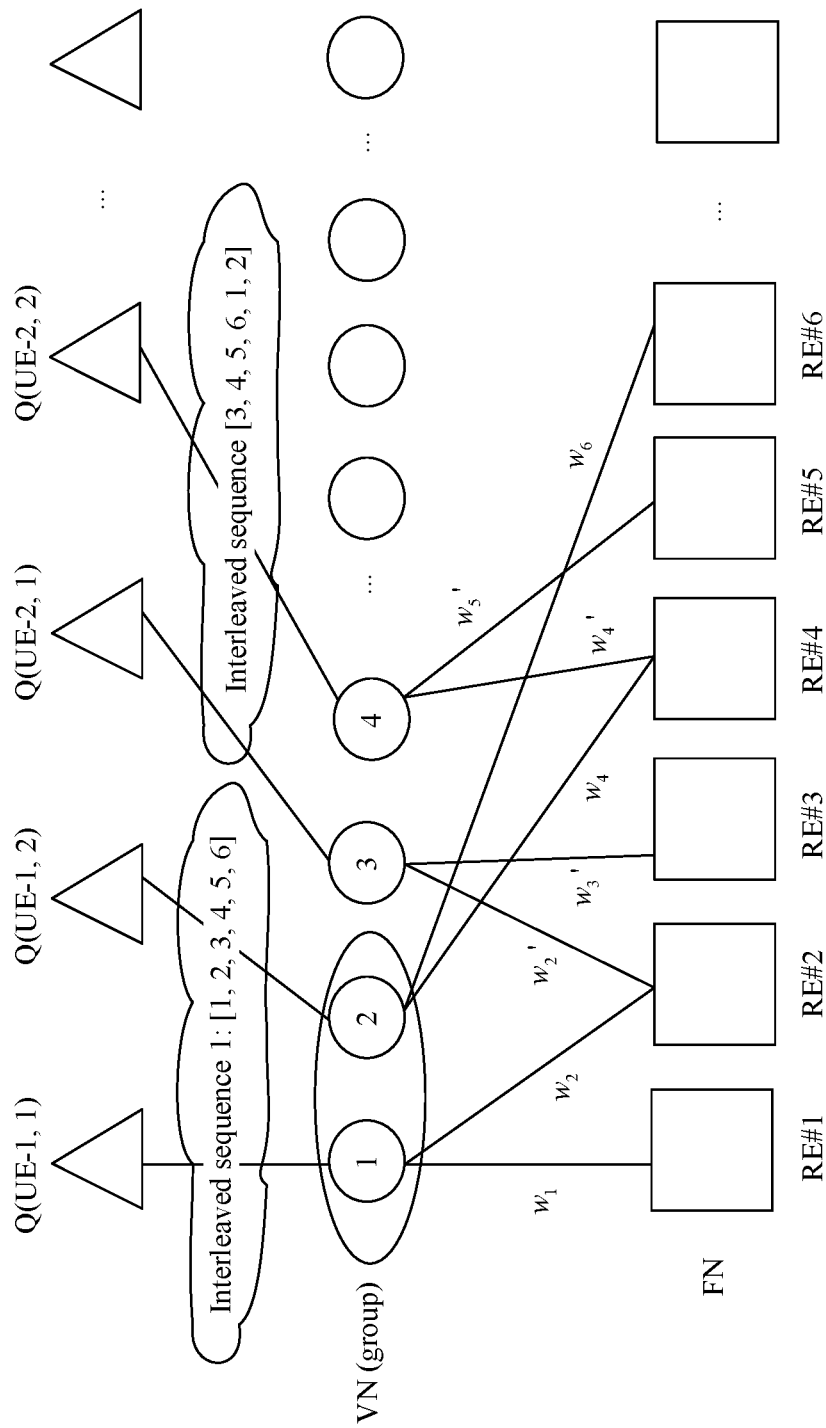
FIG. 8 is a factor graph 1 according to an embodiment of this application.
Figure 9:
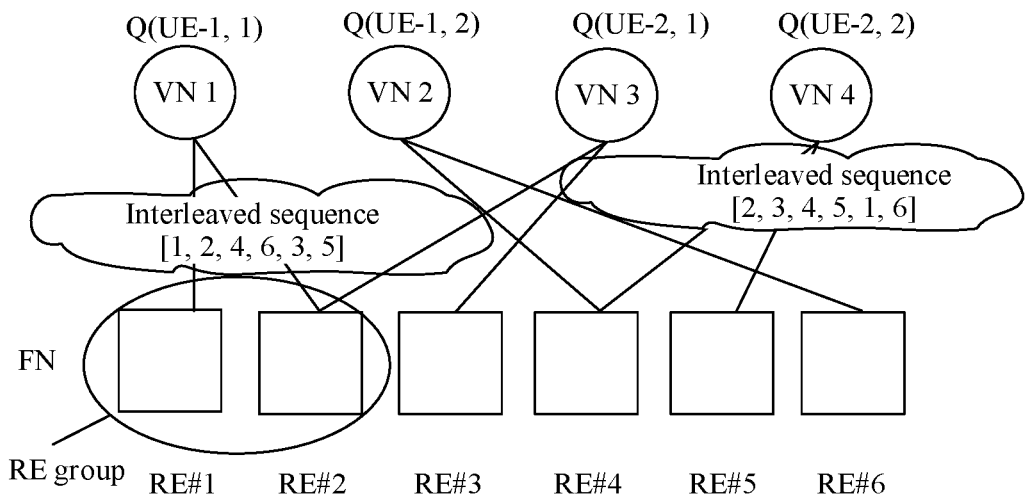
FIG. 9 is a factor graph 2 according to an embodiment of this application.

For ease of understanding, a factor graph may be used to represent an RE mapping process. When the interleaved sequence directly indicates or indirectly indicates the RE, different nodes in the factor graph have different meanings. Specifically, when an element in the interleaved sequence is directly used to indicate a location of the RE, one variable node (VN) in the factor graph represents one modulation symbol, and one function node (FN) represents one RE. When an element in the interleaved sequence is used to indicate a mapping vector, and the mapping vector is used to indicate a location of the RE (that is, the interleaved sequence is used to indirectly indicate the location of the RE), one VN represents one mapping vector, and one FN represents one RE. FIG. 8 is a factor graph in which the element in the interleaved sequence indirectly indicates the location of the RE. FIG. 9 is a factor graph in which the element in the interleaved sequence directly indicates the location of the RE.

Referring to FIG. 8, when the interleaved sequence indirectly indicates the location of the RE, after receiving the interleaved sequence index information sent by the access network device, the terminal 1 searches the stored resource mapping matrix A for a row indicated by the interleaved sequence index information. It is assumed that the row is the second row in A, and a plurality of interleaved sequences corresponding to elements in the second row are sequentially an interleaved sequence 1: [1, 2, 3, 4, 5, 6], an interleaved sequence 2: [3, 4, 5, 6, 1, 2], an interleaved sequence 3: [5, 6, 1, 2, 3, 4], and an interleaved sequence 4: [1, 2, 3, 4, 5, 6].

In each RMB in the first RMB set, for example, in the first RMB in the first RMB set, the terminal 1 respectively maps a modulation symbol 1 and a modulation symbol 2, that is, Q(UE-1,1) and Q(UE-1,2), based on values of the first two elements in the interleaved sequence 1. Specifically, the terminal 1 selects a mapping vector (which is referred to as a No. 1 mapping vector for short) numbered 1, that is, $$\begin{bmatrix} w_1 \\ w_2 \\ 0 \\ 0 \\ 0 \\ 0 \end{bmatrix},$$

in the mapping vector pool based on a value (that is, 1) of the first element in the interleaved sequence 1. The No. 1 mapping vector indicates that the terminal 1 transmits the first modulation symbol Q(UE-1, 1) by using the first RE and the second RE in the RMB. In addition, a weight for transmitting the modulation symbol by using the first RE is $w_1$, and a weight for transmitting the modulation symbol by using the second RE is $w_2$. The terminal 1 selects a No. 1 mapping vector, that is, $$\begin{bmatrix} 0 \\ 0 \\ 0 \\ w_4 \\ 0 \\ w_6 \end{bmatrix},$$

in the mapping vector pool based on a value (that is, 2) of the second element in the interleaved sequence 1. The No. 2 mapping vector indicates that the terminal 1 transmits the second modulation symbol Q(UE-1, 2) by using the fourth RE and the sixth RE in the RMB. In addition, a weight for transmitting the modulation symbol by using the fourth RE is $w_4$, and a weight for transmitting the modulation symbol by using the sixth RE is $w_6$. Similarly, in each of the other RMBs in the first RMB set, the terminal 1 also maps modulation symbols to the first RE, the second RE, the fourth RE, and the sixth RE. In addition, weights for mapping the modulation symbols to the REs are the same.

Similarly, in each RMB in the second RMB set, the terminal 1 selects a No. 3 mapping vector and a No. 4 mapping vector in the mapping vector pool based on values (3 and 4) of the first two elements in the interleaved sequence 2, to indicate specific REs used by the terminal to transmit the two modulation symbols in each RMB in the second RMB set and indicate a weight for transmitting one modulation symbol by using each RE. For a manner of performing RE mapping by the terminal 1 in the third RMB set and the fourth RMB set, refer to the description in which the terminal 1 performs RE mapping in the first RMB set and the second RMB set. For a manner of performing RE mapping by the terminal 2 in each RMB set, refer to related content in which the terminal 1 performs RE mapping in each RMB set. Details are not described herein again. FIG. 8 shows an example of REs occupied (mapped) by the terminal 1 and the terminal 2 to transmit information in each RMB in the first RMB set.

Referring to FIG. 9, when the element in the interleaved sequence directly indicates the location of the RE, available REs form an RE pool. The RE pool includes a plurality of RE groups, and each RE group includes a plurality of REs. For example, the RE group may be one subband, and a quantity of the REs included in the RE group is a quantity of REs included in one subband. Alternatively, the RE group may be one RB, and a quantity of the REs included in the RE group is a quantity (e.g., 12×7=84) of REs included in one RB. In this case, the RE mapping process is as follows.

After receiving the interleaved sequence index information sent by the access network device, the terminal 1 searches the stored resource mapping matrix A for a row indicated by the interleaved sequences used by the terminal 1. It is assumed that a row associated with the interleaved sequences corresponds to the second row in A and a plurality of interleaved sequences corresponding to elements in the second row are sequentially an interleaved sequence 1: [1, 2, 4, 6, 3, 5], an interleaved sequence 2: [4, 6, 3, 5, 1, 2], an interleaved sequence 3: [3, 5, 1, 2, 4, 6], and an interleaved sequence 4: [1, 2, 4, 6, 3, 5]. Different interleaved sequences may be used to indicate REs occupied by the terminal 1 in different RMBs. Specifically, the terminal 1 maps a modulation symbol 1 Q(UE-1, 1) based on the first two elements (that is, 1 and 2) in the interleaved sequence 1. The terminal 1 maps the modulation symbol 1 to the first RE and the second RE in the RMB, and the terminal 1 maps a modulation symbol 2 to the fourth RE and the sixth RE in the RMB based on the third element and the fourth element (that is, 4 and 6) in the interleaved sequence 1. Similarly, for a manner of performing RE mapping by the terminal 2, refer to a manner of performing RE mapping by the terminal 1. Details are not described herein again.

Optionally, the foregoing RE mapping process may also be represented by the following formula:

$$\begin{bmatrix} RE1 \\ RE2 \\ RE3 \\ RE4 \\ RE5 \\ RE6 \end{bmatrix} = \begin{bmatrix} w_1 & 0 & 0 & 0 \\ w_2 & 0 & w'_2 & 0 \\ 0 & 0 & w'_3 & 0 \\ 0 & w_4 & 0 & w'_4 \\ 0 & 0 & 0 & w'_5 \\ 0 & w_6 & 0 & 0 \end{bmatrix} \cdot \begin{bmatrix} Q(UE-1, 1) \\ Q(UE-1, 2) \\ Q(UE-2, 1) \\ Q(UE-2, 2) \end{bmatrix}$$

$$= w_1 \times Q(UE-1, 1) + w_2 \times Q(UE-1, 1) + w'_2 \times Q(UE-2, 1) + w'_3 \times Q(UE-2, 1) + w_4 \times Q(UE-1, 2) + w'_4 \times Q(UE-2, 2) + w'_5 \times Q(UE-2, 2) + w_6 \times Q(UE-1, 2).$$

For meanings of parameters in the formula, refer to the foregoing descriptions. Details are not described herein again.

Figure 10:
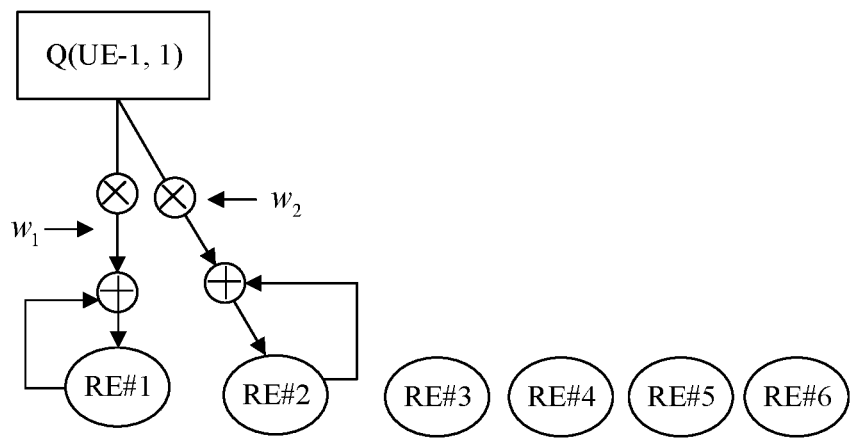
FIG. 10 is a schematic diagram of a principle of resource mapping according to an embodiment of this application.

Optionally, a detailed process of mapping the first modulation symbol Q(UE-1, 1) of the terminal 1 to the REs may be represented by FIG. 10. The modulation symbol Q(UE-1, 1) is multiplied by a weight $w_1$, and a modulation symbol multiplied by $w_1$ is mapped to RE #1. The modulation symbol Q(UE-1, 1) is multiplied by a weight $w_2$, and a modulation symbol multiplied by $w_2$ is mapped to RE #2. For a process of mapping the second modulation symbol of the terminal 1 to an RE and a process of mapping the two modulation symbols of the terminal 2 to REs, refer to content of mapping the modulation symbol to the REs shown in FIG. 10. Details are not described herein again.

It should be noted that in this embodiment of this application, REs occupied by modulation symbols in different RMB sets can be dynamically changed. Referring to FIG. 11, in the first RMB set (including six RMBs), the REs occupied by the modulation symbols of the terminal 1 are RE #1, RE #2, RE #4, and RE #6, in the second RMB set (including one RMB), the REs occupied by the modulation symbols of the terminal 1 are RE #2, RE #4, RE #5, and RE #6, and in the third RMB set (including two RMBs), the REs occupied by the modulation symbols of the terminal 1 are RE #1, RE #4, and RE #5. Similarly, the REs occupied by the modulation symbols of the terminal 2 in each RMB in different RMB sets may be different. In this way, a terminal transmits information by using different REs in different RMB sets, to enhance information transmission security, and improve anti-interference performance of a communications system.

Optionally, the resource mapping information that is sent by the access network device and that is received by the terminal may be, for example, interleaved sequences, so that the terminal directly learns, by using the interleaved sequences, REs occupied in different RMB sets.

S404: The terminal transmits the information on the mapped RE.

After the terminal learns of the RE occupied during the information transmission, the terminal may transmit the information by using the corresponding RE.

The information transmitted by the terminal includes uplink information sent by the terminal to the access network device and downlink information that is received by the terminal and that is sent by the access network device. For example, the access network device configures, for the terminal, an RE mapped in each RMB in the first RMB set. If the RE configured by the access network device for the terminal is an RE used for uplink transmission, the terminal sends the uplink information to the access network device on the RE mapped in each RMB in the first RMB set. Correspondingly, the access network device receives, on the RE mapped in each RMB in the first RMB set, the uplink information sent by the terminal. If the RE configured by the access network device for the terminal is an RE used for downlink transmission, during subsequent interaction between the access network device and the terminal, the access network device sends the downlink information to the terminal on the RE mapped in each RMB in the first RMB set. Correspondingly, the terminal receives, on the RE mapped in each RMB in the first RMB set, the downlink information sent by the access network device. For example, the RE configured by the access network device for the terminal is the RE used for the uplink transmission. Still referring to FIG. 11, in each RMB in the first RMB set, the terminal 1 sends the uplink information to the access network device by using the first RE, the second RE, the fourth RE, and the sixth RE. Correspondingly, in each RMB in the first RMB set, the access network device receives, by using the first RE, the second RE, the fourth RE, and the sixth RE, the uplink information sent by the terminal 1.

According to the resource mapping method provided in this embodiment of this application, a plurality of interleaved sequences are generated based on one base sequence, and the REs occupied by the terminal to transmit the information are determined based on different interleaved sequences. Because all the interleaved sequences used to indicate locations of the REs are generated based on the same base sequence, the access network device does not need to maintain a large quantity of random seeds, and a random sequence is not required to be generated for each terminal, so that implementation complexity of RE mapping for information transmission is reduced.

In addition, Table 1 shows a simulation result of implementing the resource mapping method in this embodiment of this application.

TABLE 1

| Difference between SNRs when a block error rate reaches $10^{-3}$ | Spectral efficiency | | | | | | |
|---|---|---|---|---|---|---|---|
| | 0.111 | 0.204 | 0.389 | 0.574 | 0.713 | 0.944 | Total |
| Quantity of terminals: 4 | | | | | | | |
| O1I3 | 0.06 | 0.04 | 0 | 0.03 | −0.14 | −0.05 | −0.06 |
| O2I3 | −0.01 | 0.01 | −0.03 | −0.03 | −0.01 | −0.02 | −0.09 |
| O3I3 | −0.01 | 0.02 | −0.03 | −0.01 | −0.04 | −0.01 | −0.08 |
| O4I3 | −0.01 | 0 | −0.02 | −0.02 | −0.02 | −0.04 | −0.11 |
| O5I3 | −0.01 | −0.01 | −0.02 | −0.02 | −0.02 | −0.01 | −0.09 |
| O6I3 | −0.01 | −0.02 | −0.02 | −0.02 | −0.02 | −0.03 | −0.12 |
| Total | 0.01 | 0.04 | −0.12 | −0.07 | −0.25 | −0.16 | −0.55 |
| Quantity of terminals: 6 | | | | | | | |
| O1I3 | 0.15 | 0.14 | −0.11 | −0.48 | −0.45 | −0.76 | −0.95 |
| O2I3 | −0.01 | 0.01 | 0 | 0 | −0.12 | −0.24 | −0.36 |
| O3I3 | 0.03 | −0.01 | −0.01 | 0.08 | −0.13 | −1.32 | −1.36 |
| O4I3 | 0.03 | −0.01 | −0.02 | 0.09 | −0.05 | −0.76 | −0.72 |
| O5I3 | 0.03 | −0.01 | −0.03 | −0.01 | −0.04 | −0.4 | −0.46 |
| O6I3 | 0.03 | −0.01 | −0.03 | 0 | −0.04 | −0.24 | −0.29 |
| Total | 0.26 | 0.11 | 0.29 | 0.7 | 0.58 | −1.72 | −4.14 |
| Quantity of terminals: 8 | | | | | | | |
| O1I3 | −0.24 | 0.14 | −1.09 | −1.17 | −1.2 | 1.29 | −2.27 |
| O2I3 | 0.03 | −0.02 | 0.01 | −1.63 | −3.29 | −4.26 | −9.16 |
| O3I3 | −0.01 | −0.04 | −0.05 | −0.05 | −2.38 | −4.98 | −7.51 |
| O4I3 | −0.01 | −0.04 | 0 | −0.1 | −1.32 | −2.51 | −3.98 |
| O5I3 | −0.01 | −0.03 | −0.01 | −0.11 | −1.21 | −1.15 | −2.52 |
| O6I3 | −0.01 | −0.03 | −0.02 | −0.14 | −1.17 | −0.95 | −2.32 |
| Total | −0.25 | −0.02 | −1.16 | −3.2 | −10.57 | −12.56 | −27.76 |
| Total | 0.02 | 0.13 | −0.99 | −2.57 | −10.24 | −14.44 | −28.09 |

O1I3 in the first column of Table 1 indicates that a quantity of outer iterations of a receiver is 1 and a quantity of inner iterations of the receiver is 3. O2I3 indicates that the quantity of outer iterations of the receiver is 2 and the quantity of inner iterations of the receiver is 3. The rest may be deduced by analogy. Data in Table 1 indicates a difference, between a signal-to-noise ratio (SNR) in the resource mapping method in this embodiment of this application and that in the conventional technology, that is used in cases of different quantities of terminals, spectral efficiencies, outer iterations of the receiver, and inner iterations of the receiver, when a same block error rate (BLER) of information transmission is reached. It can be learned from Table 1 that the difference between SNRs in Table 1 is a negative number. This indicates that when a BLER target of the information transmission is reached, the signal-to-noise ratio in the resource mapping method in this embodiment of this application is lower, and when a system load increases, that is, when the quantity of terminals increases from 4 to 8, the difference between the SNRs is greater, and a performance gain of the communications system is relatively great.

It may be understood that, to implement the foregoing functions, the network elements in the embodiments of this application include corresponding hardware structures and/or software modules for performing each function. With reference to units and algorithm steps in the examples described in the embodiments disclosed in this application, the embodiments of this application may be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the technical solutions of the embodiments of this application.

In the embodiments of this application, division into functional units may be performed on the network elements based on the method examples. For example, each functional unit may be obtained through division based on each corresponding function, or two or more than two functions may be integrated into one processing unit. The integrated unit may be implemented in a form of hardware, or may be implemented in a form of a software functional unit. It should be noted that, in the embodiments of this application, division into the units is an example and is merely logical function division. In actual implementation, another division manner may be used.

Figure 12:
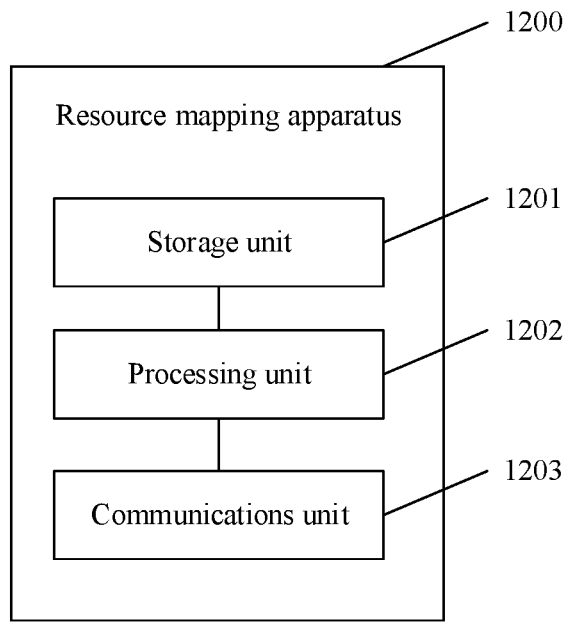
FIG. 12 is a schematic structural diagram of a resource mapping apparatus according to an embodiment of this application.

FIG. 12 is a schematic block diagram of a resource mapping apparatus according to an embodiment of this application. The resource mapping apparatus may be the foregoing terminal or the access network device. A resource mapping apparatus 1200 may exist in a form of software, or may be a chip that can be used in a device. The resource mapping apparatus 1200 includes a processing unit 1202 and a communications unit 1203.

If the resource mapping apparatus 1200 is the terminal, the processing unit 1202 may be configured to support the terminal in performing S403, S404, and the like in FIG. 4 and FIG. 5, and/or another process in the solutions described in this specification. The communications unit 1203 is configured to support communication between the terminal and another network element (e.g., the access network device). For example, the communications unit 1203 supports the terminal in performing S402 in FIG. 4 and FIG. 5, and/or another process in the solutions described in this specification.

If the resource mapping apparatus 1200 is the access network device, the processing unit 1202 may be configured to support the access network device in performing S401 in FIGS. 4 and S4011, S4012, S4013, and the like in FIG. 5, and/or another process in the solutions described in this specification. The communications unit 1203 is configured to support communication between the access network device and another network element. For example, the communications unit 1203 supports the access network device in performing S402 in FIG. 4 and FIG. 5.

Optionally, the resource mapping apparatus 1200 may further include a storage unit 1201, configured to store program code and data of the resource mapping apparatus 1200. The data may include but is not limited to original data, intermediate data, and the like.

In a possible implementation, the processing unit 1202 may be a controller or the processor 201 shown in FIG. 2, for example, may be a central processing unit (CPU), a general-purpose processor, a digital signal processor (DSP), an application-specific integrated circuit (ASIC), a field-programmable gate array (FPGA) or another programmable logic device, a transistor logic device, a hardware component, or any combination thereof. The processing unit 1202 may implement or execute various example logical blocks, modules, and circuits described with reference to content disclosed in this application. The processor may alternatively be a combination of processors implementing a computing function, for example, a combination of one or more microprocessors or a combination of a DSP and a microprocessor. The communications unit 1203 may be a transceiver, a transceiver circuit, the communications interface 204 shown in FIG. 2, or the like. The storage unit 1201 may be the memory 203 shown in FIG. 2.

Figure 13:
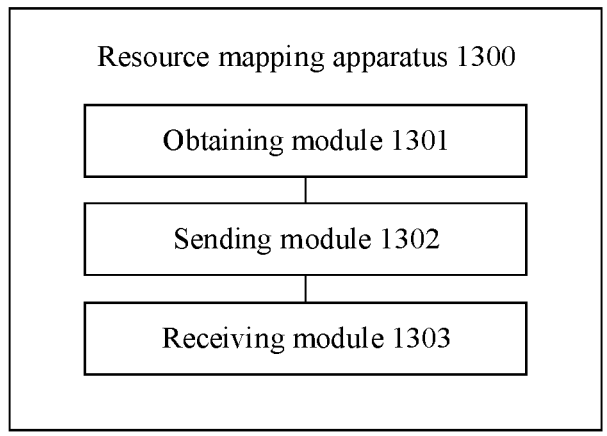
FIG. 13 is a schematic structural diagram of a resource mapping apparatus according to an embodiment of this application.

In another possible implementation, when each functional module is obtained through division based on each corresponding function, if the resource mapping apparatus is the access network device, FIG. 13 is another possible schematic structural diagram of the access network device in the foregoing embodiments. A resource mapping apparatus 1300 may include an obtaining module 1301, a sending module 1302, and a receiving module 1303. The obtaining module 1301 is configured to support the resource mapping apparatus 1300 in performing S401 in FIG. 4, and/or another process in the solutions described in this specification. The sending module 1302 is configured to support the resource mapping apparatus 1300 in performing the process S402 in FIG. 4 and FIG. 5, and/or another process in the solutions described in this specification. The receiving module 1303 is configured to support the resource mapping apparatus 1300 in receiving uplink information from a terminal, and/or is configured for another process in the solutions described in this specification. For example, if an RE configured by the access network device for the terminal is an RE used for uplink transmission, the terminal sends the uplink information to the access network device on the RE mapped in each RMB in the first RMB set. Correspondingly, the access network device receives, on the RE mapped in each RMB in the first RMB set, the uplink information sent by the terminal. All related content of the steps in the foregoing method embodiments may be cited in function descriptions of corresponding functional modules. Details are not described herein again. Certainly, to implement the technical solutions in this embodiment of this application, the resource mapping apparatus may further include another module. Details are not described herein.

Figure 14:
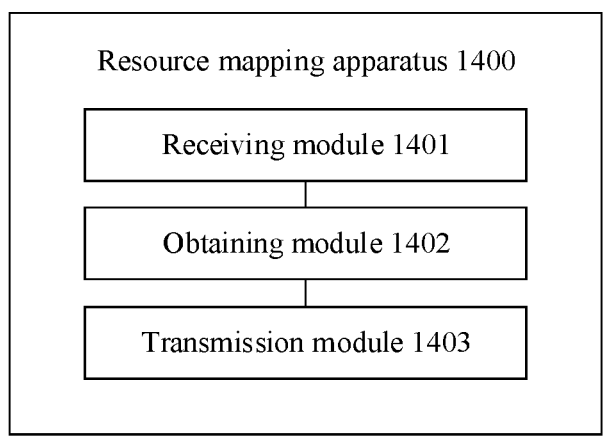
FIG. 14 is a schematic structural diagram of a resource mapping apparatus according to an embodiment of this application.

If the resource mapping apparatus is the terminal, FIG. 14 is another possible schematic structural diagram of the terminal in the foregoing embodiments. A resource mapping apparatus 1400 may include a receiving module 1401, an obtaining module 1402, and a transmission module 1403. The obtaining module 1402 is configured to support the resource mapping apparatus 1400 in performing the process S403 in FIG. 4 and FIG. 5, and/or another process in the solutions described in this specification. The receiving module 1401 is configured to support the resource mapping apparatus 1400 in performing the process S402 in FIG. 4 and FIG. 5, and/or another process in the solutions described in this specification. The transmission module 1403 is configured to support the resource mapping apparatus 1400 in performing the process S404 in FIG. 4 and FIG. 5, and/or another process in the solutions described in this specification.

A person of ordinary skill in the art may understand that all or some of the foregoing embodiments may be implemented through software, hardware, firmware, or any combination thereof. When software is used to implement the embodiments, all or some of the embodiments may be implemented in a form of a computer program product. The computer program product includes one or more computer program instructions. When the computer program instructions are loaded and executed on a computer, all or some of the procedure or functions according to the embodiments of this application are generated. The computer may be a general-purpose computer, a dedicated computer, a computer network, or another programmable apparatus. The computer instructions may be stored in a computer-readable storage medium, or may be transmitted from one computer-readable storage medium to another computer-readable storage medium. For example, the computer instructions may be transmitted from one website, computer, server, or data center to another website, computer, server, or data center in a wired (e.g., a coaxial cable, an optical fiber, or a digital subscriber line (DSL)) or wireless (e.g., infrared, radio, or microwave) manner. The computer-readable storage medium may be any usable medium that can be accessed by a computer, or a data storage device, such as a server or a data center, integrating one or more usable media. The usable medium may be a magnetic medium (e.g., a soft disk, a hard disk, or a magnetic tape), an optical medium (e.g., a digital video disc (DVD)), a semiconductor medium (e.g., a solid-state drive (SSD)), or the like.

In the several embodiments provided in this application, it should be understood that the disclosed system, apparatus, and method may be implemented in other manners. For example, the described apparatus embodiment is merely an example. For example, division into the units is merely logical function division and another division manner may be used in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network devices (e.g., terminals). Some or all of the units may be selected based on an actual requirement to achieve the objectives of the solutions of the embodiments.

In addition, the functional units in the embodiments of this application may be integrated into one processing unit, or each of the functional units may exist alone, or two or more units are integrated into one unit. The integrated unit may be implemented in a form of hardware, or may be implemented in a form of hardware combined with a software functional unit.

Based on the foregoing descriptions of the implementation, a person skilled in the art may clearly understand that this application may be implemented by software in addition to necessary universal hardware or by hardware only. In most cases, the former is a preferred implementation. Based on such an understanding, the technical solutions of this application essentially or the part contributing to the conventional technology may be implemented in a form of a software product. The computer software product is stored in a readable storage medium, such as a floppy disk, a hard disk, or an optical disc of a computer, and includes several instructions to enable a computer device (which may be a personal computer, a server, a network device, or the like) to perform the method described in the embodiments of this application.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An information transmission method, carried out on a terminal device, the method comprising:
   receiving resource mapping information sent by an access network device, wherein the resource mapping information indicates a resource element (RE) to which the terminal performs mapping in each resource mapping block (RMB) in a first RMB set; and
   transmitting information on the RE mapped in an RMB in the first RMB set,
   wherein the RE to which the terminal performs mapping in each RMB in the first RMB set is determined based on a first interleaved sequence,
   wherein the first interleaved sequence is determined based on a base sequence,
   wherein the terminal is any one of at least one terminal served by the access network device, and
   wherein the first RMB set comprises at least one RMB.

2. The information transmission method according to claim 1, wherein the resource mapping information is obtained based on a resource mapping matrix,
   wherein the resource mapping matrix is an M×N matrix, M is a positive integer, and N is a positive integer,
   wherein the resource mapping matrix comprises a plurality of interleaved sequences,
   wherein each of the plurality of interleaved sequences is obtained based on the base sequence by using a preset algorithm,
   wherein the plurality of interleaved sequences comprise the first interleaved sequence; and
   wherein:
      at least one interleaved sequence corresponding to one row of elements in the resource mapping matrix is allocated to the terminal for use, wherein an interleaved sequence corresponding to an element in an $i^{th}$ column of the row is used to determine an RE to which the terminal performs mapping in each RMB in an $i^{th}$ RMB set; or
      at least one interleaved sequence corresponding to one column of elements in the resource mapping matrix is allocated to the terminal for use, wherein an interleaved sequence corresponding to an element in a $j^{th}$ row of the column is used to determine an RE to which the terminal performs mapping in each RMB in a $j^{th}$ RMB set.

3. The information transmission method according to claim 2, wherein
the resource mapping matrix satisfies the following relationship:

$$A = \begin{bmatrix} \pi_{1,1} & \pi_{1,2} & \ldots & \pi_{1,C} \\ \pi_{2,1} & \pi_{2,2} & \ldots & \pi_{2,C} \\ \ldots & \pi_{n,c} & \ldots & \ldots \\ \pi_{N,1} & \pi_{N,2} & \ldots & \pi_{N,C} \end{bmatrix},$$

where A is the resource mapping matrix, and
wherein:
   a sequence $\pi_{n,c}$ is an interleaved sequence used by a terminal n to perform mapping to an RE in each RMB in a $c^{th}$ RMB set, wherein an element in $\pi_{n,c}$ is used to indicate a mapping vector used by the terminal n to perform mapping to the RE in each RMB in the $C^{th}$ RMB set, and the mapping vector is used to indicate a location of the RE to which a modulation symbol of the terminal n is mapped in each RMB in the $c^{th}$ RMB set; or an element in $\pi_{n,c}$ is used to indicate a location of the RE to which a modulation symbol of the terminal n is mapped in each RMB in the $C^{th}$ RMB set, and the terminal n is any one of the at least one terminal served by the access network device; or
   a sequence $\pi_{n,c}$ is an interleaved sequence used by a terminal c to perform mapping to an RE in each RMB in an $n^{th}$ RMB set, wherein an element in $\pi_{n,c}$ is used to indicate a mapping vector used by the terminal C to perform mapping to the RE in each RMB in the $n^{th}$ RMB set, and the mapping vector is used to indicate a location of the RE to which a modulation symbol of the terminal C is mapped in each RMB in the $n^{th}$ RMB set; or an element in $\pi_{n,c}$ is used to indicate a location of the RE to which a modulation symbol of the terminal c is mapped in each RMB in the $n^{th}$ RMB set, and the terminal c is any one of the at least one terminal served by the access network device.

4. The information transmission method according to claim 1, wherein the base sequence satisfies the following relationship:

$$\pi=[\alpha_1,\alpha_2,\ldots,\alpha_J],$$

wherein:

π is the base sequence, and a value of an element $\alpha_j$ in the base sequence is an integer.

5. The information transmission method according to claim 1, wherein the base sequence is a sequence type taken from the group consisting of:

a natural sequence, an extended sequence of the natural sequence, a bit reversal sequence of the natural sequence, an extended sequence of the bit reversal sequence, and a fixed sequence.

6. A terminal device comprising:

a processor; and a non-transitory memory including computer-executable instructions that, when executed by the processor, cause the terminal device to carry out a method including:

receiving a resource mapping information sent by an access network device, wherein the resource mapping information indicates a resource element (RE) to which the resource mapping apparatus performs mapping in each resource mapping block (RMB) in a first RMB set; and transmitting information on the RE mapped in an RMB in the first RMB set;

wherein the RE to which the terminal performs mapping in each RMB in the first RMB set is determined based on a first interleaved sequence, wherein the first interleaved sequence is determined based on a base sequence, wherein terminal device is any one of at least one terminal served by the access network device, and wherein the first RMB set comprises at least one RMB.

7. The terminal device according to claim 6, wherein the resource mapping information is obtained based on a resource mapping matrix, wherein the resource mapping matrix is an M×N matrix, M is a positive integer, N is a positive integer, wherein the resource mapping matrix comprises a plurality of interleaved sequences, wherein each of the plurality of interleaved sequences is obtained based on the base sequence by using a preset algorithm, wherein the plurality of interleaved sequences comprise the first interleaved sequence; and wherein:

at least one interleaved sequence corresponding to one row of elements in the resource mapping matrix is allocated to the resource mapping apparatus for use, wherein an interleaved sequence corresponding to an element in an $i^{th}$ column of the row is used to determine an RE to which the resource mapping apparatus performs mapping in each RMB in an $i^{th}$ RMB set; or at least one interleaved sequence corresponding to one column of elements in the resource mapping matrix is allocated to the resource mapping apparatus for use, wherein an interleaved sequence corresponding to an element in a $j^{th}$ row of the column is used to determine an RE to which the resource mapping apparatus performs mapping in each RMB in a $j^{th}$ RMB set.

8. The terminal device according to claim 7, wherein the resource mapping matrix satisfies the following relationship:

$$A = \begin{bmatrix} \pi_{1,1} & \pi_{1,2} & \ldots & \pi_{1,C} \\ \pi_{2,1} & \pi_{2,2} & \ldots & \pi_{2,C} \\ \ldots & \pi_{n,c} & \ldots & \ldots \\ \pi_{N,1} & \pi_{N,2} & \ldots & \pi_{N,C} \end{bmatrix},$$

where A is the resource mapping matrix, and wherein:

a sequence $\pi_{n,c}$ is an interleaved sequence used by a terminal n to perform mapping to an RE in each RMB in a $C^{th}$ RMB set, wherein an element in $\pi_{n,c}$ is used to indicate a mapping vector used by the terminal n to perform mapping to the RE in each RMB in the $c^{th}$ RMB set, and the mapping vector is used to indicate a location of the RE to which a modulation symbol of the terminal n is mapped in each RMB in the $c^{th}$ RMB set; or an element in $\pi_{n,c}$ is used to indicate a location of the RE to which a modulation symbol of the terminal n is mapped in each RMB in the $c^{th}$ RMB set, and the terminal n is any one of the at least one terminal served by the access network device; or a sequence $\pi_{n,c}$ is an interleaved sequence used by a terminal C to perform mapping to an RE in each RMB in an $n^{th}$ RMB set, wherein an element in $\pi_{n,c}$ is used to indicate a mapping vector used by the terminal c to perform mapping to the RE in each RMB in the $n^{th}$ RMB set, and the mapping vector is used to indicate a location of the RE to which a modulation symbol of the terminal C is mapped in each RMB in the $n^{th}$ RMB set; or an element in $\pi_{n,c}$ is used to indicate a location of the RE to which a modulation symbol of the terminal C is mapped in each RMB in the $n^{th}$ RMB set, and the terminal c is any one of the at least one terminal served by the access network device.

9. The terminal device according to claim 6, wherein the base sequence satisfies the following relationship:

$$\pi=[\alpha_1,\alpha_2,\ldots,\alpha_J],$$

where:

π the base sequence, and a value of an element $\alpha_j$ in the base sequence is an integer.

10. The terminal device according to claim 6, wherein the base sequence is a sequence type taken from the group consisting of:

a natural sequence, an extended sequence of the natural sequence, a bit reversal sequence of the natural sequence, an extended sequence of the bit reversal sequence, and a fixed sequence.

\* \* \* \* \*

UNITED STATES PATENT AND TRADEMARK OFFICE
CERTIFICATE OF CORRECTION

| | |
|---|---|
| PATENT NO. | : 11,963,170 B2 |
| APPLICATION NO. | : 17/187364 |
| DATED | : April 16, 2024 |
| INVENTOR(S) | : Huazi Zhang et al. |

It is certified that error appears in the above-identified patent and that said Letters Patent is hereby corrected as shown below:

On the Title Page

Abstract, Lines 6-9 reads as "The resource mapping information indicates a resource element RE to which each of the at least one terminal performs mapping in each RMB in a first recourse mapping block RMB set."
Should read as --The resource mapping information indicates a resource element (RE) to which each of the at least one terminal performs mapping in each resource mapping block (RMB) in a first RMB set.--

Signed and Sealed this
First Day of April, 2025

Coke Morgan Stewart
*Acting Director of the United States Patent and Trademark Office*